United States Patent
Lu et al.

(10) Patent No.: US 11,609,872 B2
(45) Date of Patent: Mar. 21, 2023

(54) INTEGRATED CIRCUIT HAVING LANES INTERCHANGEABLE BETWEEN CLOCK AND DATA LANES IN CLOCK FORWARD INTERFACE RECEIVER

(71) Applicant: M31 TECHNOLOGY CORPORATION, Hsinchu County (TW)

(72) Inventors: Yueh-Chuan Lu, Hsinchu (TW); Ching-Hsiang Chang, Hsinchu (TW)

(73) Assignee: M31 TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 17/343,704

(22) Filed: Jun. 9, 2021

(65) Prior Publication Data

US 2021/0303490 A1    Sep. 30, 2021

Related U.S. Application Data

(63) Continuation of application No. 16/529,575, filed on Aug. 1, 2019, now Pat. No. 11,055,241, which is a continuation-in-part of application No. 15/805,098, filed on Nov. 6, 2017, now Pat. No. 10,387,360.

(51) Int. Cl.
*G06F 13/20* (2006.01)
*G06F 1/10* (2006.01)

(52) U.S. Cl.
CPC ............... *G06F 13/20* (2013.01); *G06F 1/10* (2013.01)

(58) Field of Classification Search
CPC ........................................................ G06F 1/10
See application file for complete search history.

(56) References Cited

U.S. PATENT DOCUMENTS

| | | | |
|---|---|---|---|
| 6,961,347 B1 | 11/2005 | Bunton et al. | |
| 2005/0086417 A1* | 4/2005 | Meyer ................... | G06F 13/161 711/170 |
| 2009/0276558 A1 | 11/2009 | Goma et al. | |

(Continued)

OTHER PUBLICATIONS

English Abstract Translations of CN107797606A, CN105224485A and CN106921386A.
English Abstract of CN104579455A and CN109791530A.

*Primary Examiner* — Idriss N Alrobaye
*Assistant Examiner* — Ronald T Modo
(74) *Attorney, Agent, or Firm* — WPAT, P.C., Intellectual Property Attorneys; Anthony King

(57) ABSTRACT

An integrated circuit in a transmitter includes a multi-lane interface, N signal generating circuits, a lane selection circuit and a control circuit. The multi-lane interface has N lanes. M of the N signal generating circuits are configured to generate M clock signals respectively. (N-M) of the N signal generating circuits are configured to generate (N-M) data signals respectively. The lane selection circuit is configured to select M of the N lanes as M clock lanes by coupling the M clock signals to the M clock lanes respectively, and couple one of the (N-M) data signals to one of remaining (N-M) lanes, serving as (N-M) data lanes, according to a data select signal. The control circuit is configured to generate a data select signal according to a lane identifier of the one of the (N-M) lanes. The data select signal has a signal value mapping to the lane identifier.

16 Claims, 19 Drawing Sheets

(56) References Cited

U.S. PATENT DOCUMENTS

| | | | |
|---|---|---|---|
| 2011/0191619 A1* | 8/2011 | Morrison | H04L 25/14 |
| | | | 713/500 |
| 2012/0192043 A1 | 7/2012 | Jiang et al. | |
| 2013/0077623 A1 | 3/2013 | Han | |
| 2017/0272231 A1 | 9/2017 | Chen | |
| 2019/0045090 A1* | 2/2019 | Chiueh | G06F 13/385 |

* cited by examiner

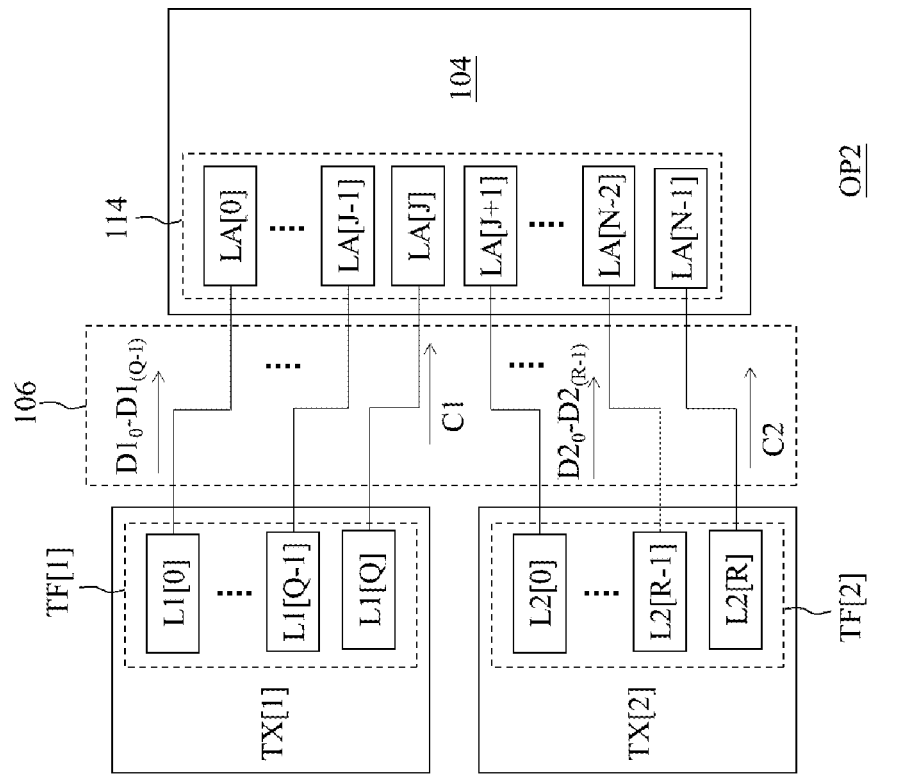
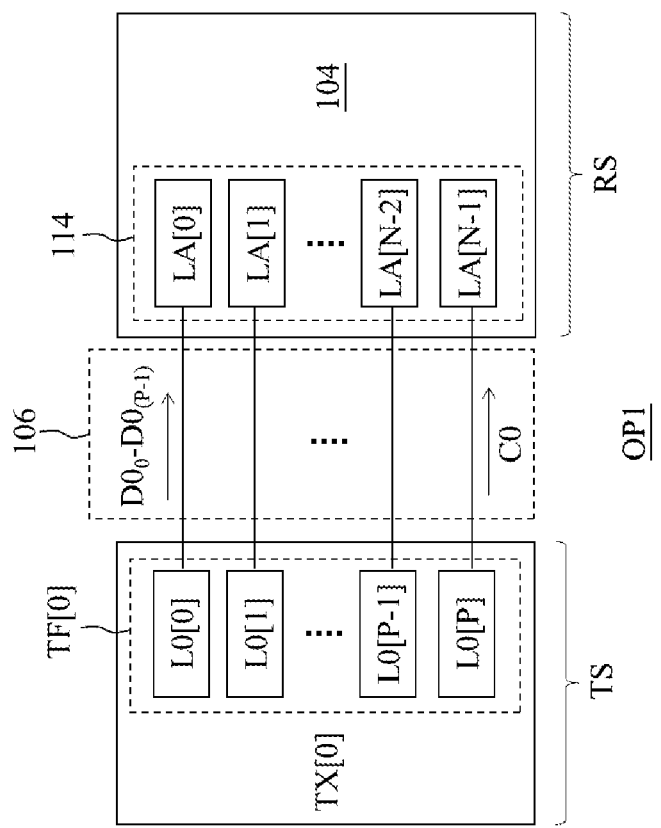
FIG. 2B
FIG. 2A

INTEGRATED CIRCUIT HAVING LANES INTERCHANGEABLE BETWEEN CLOCK AND DATA LANES IN CLOCK FORWARD INTERFACE RECEIVER

CROSS-REFERENCE TO RELATED APPLICATIONS

The present application is a continuation of U.S. application Ser. No. 16/529,575 filed Aug. 1, 2019, which is a continuation-in-part of U.S. application Ser. No. 15/805,098 filed Nov. 6, 2017, each of which is incorporated herein by reference in its entirety and to which priority is claimed.

BACKGROUND

The present disclosure relates to clock forwarding interfaces, and more particularly, to an integrated circuit having lanes interchangeable between clock and data lanes in a clock forward interface receiver, and a physical layer of a clock forward interface receiver.

Some communication systems utilize a clock forwarding scheme to offer high speed data transmission between transmitters and receivers. In the clock forwarding scheme, a clock signal is sent along with one or more data signals from a transmitter to a receiver. For example, the receiver can include a clock forwarding interface which has a clock lane and multiple data lanes. A clock signal on the clock lane is forwarded along with data signals on the data lanes from the transmitter to the receiver. As a result, the receiver can capture the data signals using the forwarded clock signal sourced from the transmitter. Depending on the physical layer (PHY) specification in use, each lane of the clock forwarding interface, i.e. a clock lane or a data lane, can be a point-to-point, two-wire or three-wire interface used for clock or data transmission.

SUMMARY

The described embodiments provide an integrated circuit having lanes interchangeable between clock and data lanes in a clock forward interface receiver, and a related physical layer.

Some embodiments described herein comprise an integrated circuit in a transmitter. The integrated circuit comprises a multi-lane interface, N signal generating circuits, a lane selection circuit and a control circuit. The multi-lane interface has N lanes. N is an integer greater than one. The N signal generating circuits are coupled to the multi-lane interface. M of the N signal generating circuits are configured to generate M clock signals respectively, and (N-M) of the N signal generating circuits are configured to generate (N-M) data signals respectively. M is a positive integer less than N. The lane selection circuit, coupled between the multi-lane interface and the N signal generating circuits, is configured to select M of the N lanes as M clock lanes by coupling the M clock signals to the M clock lanes respectively, and couple one of the (N-M) data signals to one of remaining (N-M) lanes according to a data select signal. The remaining (N-M) lanes serve as (N-M) data lanes. The control circuit is configured to generate a data select signal according to a lane identifier of the one of the (N-M) lanes. The data select signal has a signal value mapping to the lane identifier of the one of the (N-M) lanes.

Some embodiments described herein comprise an integrated circuit in a transmitter. The integrated circuit comprises a multi-lane interface, N signal generating circuits, a lane selection circuit and a control circuit. The multi-lane interface has N lanes. N is an integer greater than one. The N signal generating circuits are coupled to the multi-lane interface. M of the N signal generating circuits are configured to generate M clock signals respectively, and (N-M) of the N signal generating circuits are configured to generate (N-M) data signals respectively. M is a positive integer less than N. The lane selection circuit, coupled between the multi-lane interface and the N signal generating circuits, is configured to select M of the N lanes as M clock lanes. Remaining (N-M) lanes serve as (N-M) data lanes. In a mode, one of the N lanes is selected as a clock lane for outputting one of the M clock signals according to a clock select signal. In another mode, the selected one of the N lanes serves as a data lane for outputting one of the (N-M) data signals according to a data select signal. The control circuit is configured to generate the clock select signal and the data select signal. The control circuit is configured to generate the data select signal according to a lane identifier of the selected one of the N lanes in the another mode, and the data select signal has a signal value mapping to the lane identifier of the selected one of the N lanes.

Some embodiments described herein comprise a physical layer of a receiver. The physical layer comprises a physical medium attachment layer (PMA) and a physical coding sublayer (PCS). The PMA is configured to output M first clock signals associated with M different clock domains, respectively. M is an integer greater than one. The PCS has N first lanes and is coupled to PMA. The PCS is configured to select M of the N first lanes as M first clock lanes, and receive the M first clock signals through the M first clock lanes. N is an integer greater than M, and one or more of remaining (N-M) of the N first lanes serve as one or more first data lanes With the use of at least one lane interchangeable between a data lane and a clock lane, a physical layer on a receiver side can support different lane configurations on a transmitter side. For example, the physical layer can be split into multiple physical interfaces to support multiple transmitters. Also, a clock/data lane can be selected according to a lane identifier thereof, thereby facilitating selection of clock/data lanes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A through FIG. 2C illustrate different modes at the receiver shown in FIG. 1 in accordance with some embodiments of the present disclosure.

DETAILED DESCRIPTION

Figure 1:
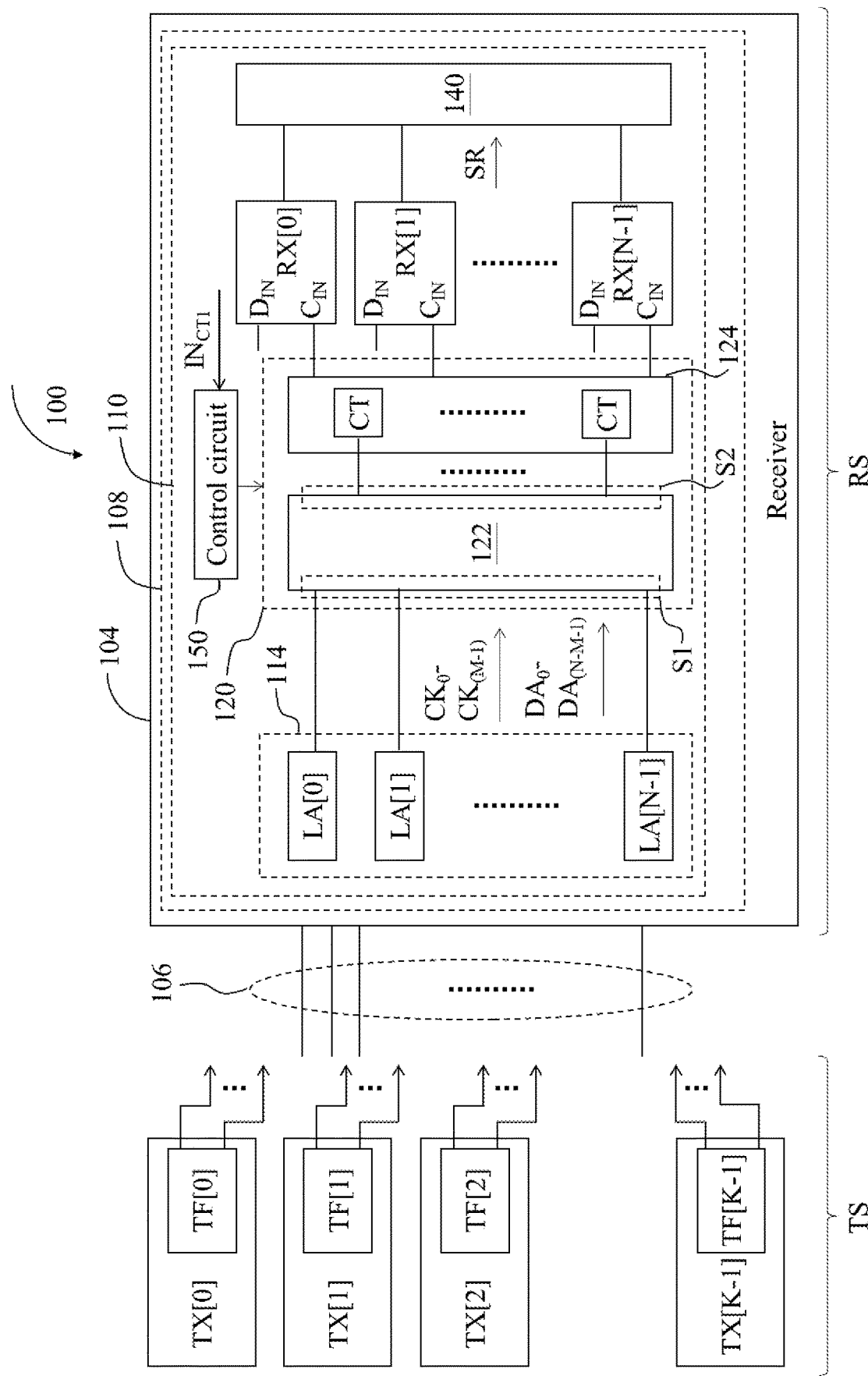
FIG. 1 is a block diagram illustrating an exemplary multi-lane communication system in accordance with some embodiments of the present disclosure.

The following disclosure provides many different embodiments, or examples, for implementing different features of the provided subject matter. Specific examples of parameter values, components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

A physical layer of a receiver utilizing a clock forwarding interface may use a dedicated clock lane to receive a clock signal sent over a clock lane on a transmitter side. However, in some applications where the clock lane and data lanes on the transmitter side are interchanged for certain communication requirements, such receiver is no longer applicable. For example, the number of transmitter devices on the transmitter side may vary. As another example, a transmitter device on the transmitter side can interchange its clock lane and data lanes in different operating scenarios.

The present disclosure describes an exemplary integrated circuit having lanes interchangeable between clock and data lanes in a clock forward interface receiver. In some embodiments, the exemplary integrated circuit can be implemented in a sublayer of a physical layer of the receiver, such as a physical medium attachment layer (PMA) or a physical coding sublayer (PCS). With the use of the exemplary integrated circuit, the clock forward interface receiver can be adaptable to the interchange between clock and data lanes, thereby supporting different lane arrangements on a transmitter side.

FIG. 1 is a block diagram illustrating an exemplary multi-lane communication system in accordance with some embodiments of the present disclosure. The multi-lane communication system 100 includes K transmitters TX[0]-TX[K−1] on a transmitter side TS and a receiver 104 on a receiver side RS, where K is a positive integer. Each of the transmitters TX[0]-TX[K−1] may include a multi-lane interface, i.e. one of K multi-lane interfaces TF[0]-TF[K−1], for transmitting clock information and data information. Each of the multi-lane interfaces TF[0]-TF[K−1] may include at least one clock lane and at least one data lane (not shown in FIG. 1).

The receiver 104 is configured to communicate with each of the transmitters TX[0]-TX[K−1] through a communication link 106 therebetween. A physical layer (PHY) 108 of the receiver 104 can employ a clock forwarding scheme to receive clock information and data information sent over the communication link 106. As a result, at least one clock signal can be forwarded along with at least one data signal from the transmitter side TS to the receiver side RS. The physical layer 108 includes an integrated circuit 110, which can be disposed in a physical medium attachment layer (PMA) or a physical coding sublayer (PCS) thereof. The integrated circuit 110 is adaptable to various lane arrangements/configurations on the transmitter side TS. For example, the integrated circuit 110 can operate in a mode to communicate with the transmitter side TS where a single lane is selected as a clock lane for transmitting a clock signal. The integrated circuit 110 can operate in another mode to communicate with the transmitter side TS where multiple lanes are selected as clock lanes for transmitting multiple clock signals.

In the present embodiment, the integrated circuit 110 includes, but is not limited to, a multi-lane interface 114, a lane selection circuit 120 and N sampling circuits RX[0]-RX[N−1], where N is an integer greater than one. The multi-lane interface 114 is connected to each of the multi-lane interfaces TF[0]-TF[K−1] through the communication link 106. The multi-lane interface 114 includes N lanes LA[0]-LA[N−1], at least one of which is interchangeable between a clock lane and a data lane.

The lane selection circuit 120, coupled to the multi-lane interface 114, is configured to select M of the lanes LA[0]-LA[N−1] as M clock lanes, wherein M is a positive integer less than N. Also, the lane selection circuit 120 is configured to output M signals $CK_0$-$CK_{(M-1)}$ on the M clock lanes, i.e. M clock signals. Remaining (N-M) lanes can serve as (N-M) data lanes, respectively. At least one of the (N-M) data lanes can carry a data signal transmitted from the transmitter side TS. In the present embodiment, the M clock signals are forwarded along with (N-M) data signals, i.e. (N-M) signals $DA_0$-$DA_{(N-M-1)}$ on the (N-M) lanes, such that each data lane can carry a data signal. It is worth noting that the lane selection circuit 120 can select any one of the lanes LA[0]-LA[N−1] as a clock lane. Each of the lanes LA[0]-LA[N−1] can be interchanged between a clock lane and a data lane.

In the present embodiment, the lane selection circuit 120 includes, but is not limited to, a plurality of selection stages 122 and 124. The selection stage 122 has an input side S1 and an output side S2. The input side S1 is coupled to the multi-lane interface 114. The selection stage 122 is configured to couple the signals $CK_0$-$CK_{(M-1)}$ on the M clock lanes from the input side S1 to the output side S2. The selection stage 124, disposed between the output side S2 and the sampling circuits RX[0]-RX[N-1], is configured to couple each of the signals $CK_0$-$CK_{(M-1)}$ to one or more of the sampling circuits RX[0]-RX[N-1]. For example, the selection stage 122 can be implemented as an N-to-M multiplexer, which couples M of the N lanes LA[0]-LA[N-1] to the output side S2. The selection stage 124 can be implemented as M clock trees CT, each of which is configured to distribute a clock signal, i.e. one of the signals $CK_0$-$CK_{(M-1)}$, to more than one sampling circuit.

The sampling circuits RX[0]-RX[N-1], coupled to the multi-lane interface 114 and the lane selection circuit 120, are configured to perform data sampling according to the clock and data information transmitted from the transmitter side TS. In the present embodiment, each of the sampling circuits RX[0]-RX[N-1] is configured to receive one of the signals $CK_0$-$CK_{(M-1)}$ from the M clock lanes. Also, (N-M) of the sampling circuits RX[0]-RX[N-1], respectively coupled to the (N-M) data lanes, are configured to receive the signals $DA_0$-$DA_{(N-M-1)}$ from the (N-M) data lanes. Each of the (N-M) sampling circuits is configured to sample one of the signals $DA_0$-$DA_{(N-M-1)}$ according to one of the signals $CK_0$-$CK_{(M-1)}$.

By way of example but not limitation, each of the sampling circuits RX[0]-RX[N-1] may include a clock input $C_{IN}$ and a data input $D_{IN}$. Each sampling circuit is configured to sample a signal inputted to a corresponding data input $D_{IN}$ using a signal inputted to a corresponding clock input $C_{IN}$. By coupling M of the lanes LA[0]-LA[N-1] to N clock inputs $C_{IN}$ of the sampling circuits RX[0]-RX[N-1], the lane selection circuit 120 can select the M of the lanes LA[0]-LA[N-1] as the M clock lanes. Each of the remaining (N-M) lanes may be coupled to a data input $D_{IN}$ while uncoupled from the N clock inputs $C_{IN}$, thereby serving as a data lane. As a result, each sampling circuit, when coupled to a data lane though a data input $D_{IN}$ thereof and coupled to a clock lane through a clock input $C_{IN}$ thereof, can be configured to sample a signal on the data lane using a signal on the clock lane. In some embodiments, a clock lane can be coupled to one or more of the N clock inputs $C_{IN}$, such that multiple sampling circuits can perform data sampling according to a same clock signal.

A sampling result SR outputted by the sampling circuits RX[0]-RX[N-1] includes clock and data information, which is sent to an output circuit 140 including other functional blocks (not shown) in the integrated circuit 110 for further processing. For example, a sampling circuit, which is coupled to one of the signals $CK_0$-$CK_{(M-1)}$ and one of the signals $DA_0$-$DA_{(N-M-1)}$, can output a data signal as a portion of the sampling result SR. A sampling circuit, which is coupled to one of the signals $CK_0$-$CK_{(M-1)}$ while uncoupled from the signals $DA_0$-$DA_{(N-M-1)}$, can output a clock signal as another portion of the sampling result SR. The output circuit 140 can output M clock signals and (N-M) data signals according to the sampling result SR. In some embodiments, the output circuit 140 can include a deserializer block. Each of the M clock signals and the (N-M) data signals outputted from the output circuit 140 can be a multi-bit parallel output signal.

In some embodiments, a transmitter may provide information to indicate which lane should be used as a clock lane. According to the information provided by the transmitter, the receiver 104 will configure the lane selection circuit 120 to select a proper lane as the clock lane. The receiver 104 can correctly use a signal on the clock lane to process signals on one or more data lanes.

In some embodiments, a transmitter may generate a clock signal on a lane by repeating a specific bit pattern, thereby indicating which lane on the receiver side RS should be used as a clock lane. For example, the transmitter may repeatedly send a bit pattern "01", such as 01010101, as a clock signal. The receiver 104 can recognize which lane is the clock lane by checking whether a bit stream received from a lane has a repeating bit pattern therein. That is, the receiver 104 can configure the lane selection circuit 120 according to a detection result of a predetermined repeating bit pattern.

In some embodiments, a system application (not shown in FIG. 1) regarding the receiver 104 may determine which lane of the multi-lane interface 104 should be used as a clock lane. According to commands issued by the system application, the receiver 104 can configure the lane selection circuit 120 to select a proper lane as the clock lane.

Please note that the above is provided for illustrative purposes, and is not intended to limit the scope of the present disclosure. In some embodiments, the lane selection circuit 120 shown in FIG. 1 may be implemented by a single selection stage or more than two selection stages without departing from the scope of the present disclosure. In some embodiments, at least one of the sampling circuits RX[0]-RX[N-1] shown in FIG. 1 may be implemented using a sampling circuit having more than one data input. In some embodiments, at least one of the sampling circuits RX[0]-RX[N-1] shown in FIG. 1 may be implemented using a sampling circuit having more than one clock input.

With the use of at least one lane interchangeable between a data lane and a clock lane, the physical layer 108 on the receiver side RS can support different lane configurations on the transmitter side TS. Some embodiments of lane configurations on the transmitter side TS are given as follows for description of a lane interchange scheme on the receiver side RS. Those skilled in the art should appreciate that the lane interchange scheme on the receiver side RS can support other lane arrangements on the transmitter side TS without departing from the scope of the present disclosure.

Figure 2C:
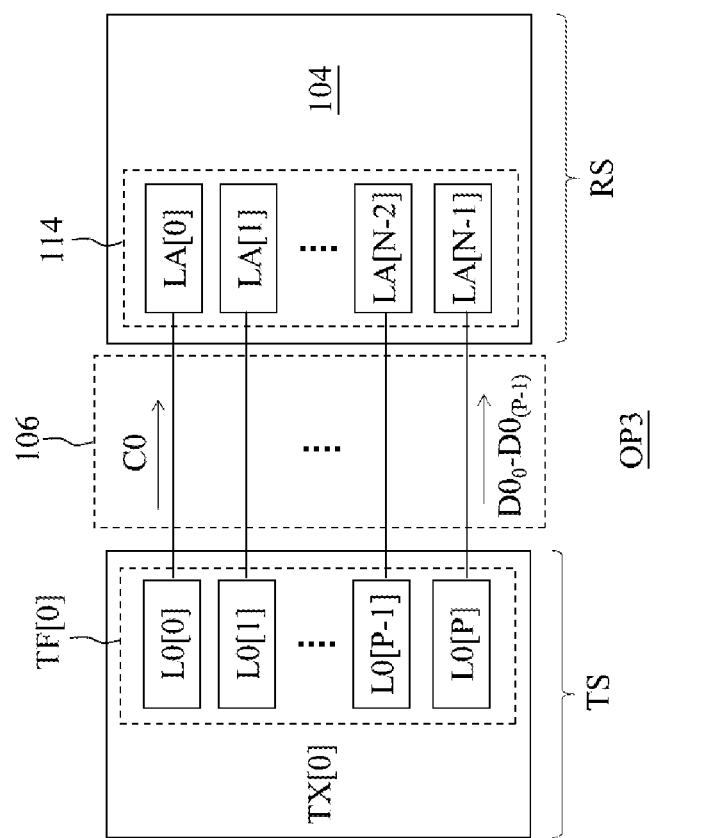

FIGS. 2A-2C illustrate different modes at the receiver 104 shown in FIG. 1 in accordance with some embodiments of the present disclosure. The receiver 104 operates in different modes OP1-OP3 according to different lane configurations on the transmitter side TS, respectively. In the mode OP1 shown in FIG. 2A, the receiver 104 is configured to receive clock and data information provided by a single transmitter, represented by the transmitter TX[0] shown in FIG. 1 for illustrative purposes. The multi-lane interface TF[0] of the transmitter TX[0] includes a plurality of lanes L0[0]-L0[P], where P is a positive integer. The transmitter TX[0] is configured to output a clock signal C0 on the lane L0[P] along with P data signals $D0_0$-$D0_{(P-1)}$ on the lanes L0[0]-L0[P-1].

The receiver 104 is configured to select one of the lanes LA[0]-LA[N-1] as a clock lane, i.e. M=1, for receiving the clock signal C0 through the communication link 106, wherein P of the remaining (N-1) lanes can serve as P data lanes for receiving the data signals $D0_0$-$D0_{(P-1)}$. In the present embodiment, the sum of the number of data signals and the number of clock signals sent from the transmitter TX[0] may be equal to the number of lanes of the multi-lane interface 114, i.e. P+1=N. As a result, each of the lanes LA[0]-LA[N-1] is used for receiving signal information provided by the transmitter TX[0]. The receiver 104 can select the lane LA[N-1], to which the clock signal C0 on the lane L0[P] is inputted, as the clock lane. The remaining (N-1) lanes LA[0]-LA[N-2] can serve as (N-1) data lanes for receiving the data signals $D0_0$-$D0_{(P-1)}$.

In the mode OP2 shown in FIG. 2B, the receiver 104 can be configured to receive clock and data information provided by multiple transmitters, wherein multiple lanes on the transmitter side TS serve as clock lanes for carrying clock signals. For example, when operating in a bifurcation mode, the physical layer 108 can be split into separate physical layers to support multiple ones of the transmitters TX[0]-TX[K−1] shown in FIG. 1, which are represented by two transmitters TX[1] and TX[2] in the present embodiment for illustrative purposes. The multi-lane interface TF[1] of the transmitter TX[1] includes a plurality of lanes L1[0]-L1[Q], where Q is a positive integer. The transmitter TX[1] is configured to output a clock signal C1 on the lane L1[Q] along with Q data signals $D1_0$-$D1_{(Q-1)}$ on the lanes L1[0]-L1[Q−1]. The multi-lane interface TF[2] of the transmitter TX[2] includes a plurality of lanes L2[0]-L2[R], where R is a positive integer. The transmitter TX[2] is configured to output a clock signal C2 on the lane L2[R] along with R data signals $D2_0$-$D2_{(R-1)}$ on the lanes L2[0]-L2[R−1]. As two lanes on the transmitter side TS are used as clock lanes in the mode OP2, the lane configuration on the transmitter side TS in the mode OP2 is different from that in the mode OP1 where a single lane is used as a clock lane.

In response to the mode OP2, the receiver 104 is configured to select two of the lanes LA[0]-LA[N−1] as two clock lanes, i.e. M=2, for receiving the clock signals C1 and C2 sent from the transmitter side TS, wherein (Q+R) of the remaining (N−2) lanes can serve as (Q+R) data lanes for receiving the data signals $D1_0$-$D1_{(Q-1)}$ and $D2_0$-$D2_{(R-1)}$. In the present embodiment, the sum of the number of data signals and the number of clock signals sent from the transmitters TX[1] and TX[2] may be equal to the number of lanes of the multi-interface 114, i.e. Q+R+2=N. As a result, each of the lanes LA[0]-LA[N−1] is used for receiving signal information provided by the transmitters TX[1] and TX[2]. The receiver 104 can select the lanes LA[J] and LA[N−1], to which the clock signals C1 and C2 are inputted, as the two clock lanes. J is an integer ranging from 0 to N−2. The remaining (N−2) lanes can serve as (N−2) data lanes to receive the data signals $D1_0$-$D1_{(Q-1)}$ and $D2_0$-$D2_{(R-1)}$. As the lane LA[J] can be used as a data lane in the mode OP1 while used as a clock lane in the mode OP2, the integrated circuit 110 can support not only a single transmitter but also multiple transmitters.

In some embodiments, one or more transmitters may have a lane interchanged between a data lane and a clock lane to provide different lane configurations on the transmitter side TS. For example, in the mode OP3 shown in FIG. 2C, the receiver 104 is configured to receive clock and data information provided by the transmitter TX[0], which sends the clock signal C0 from the lane L0[0], and sends the data signals $D0_0$-$D0_{(P-1)}$ from the lanes L0[1]-L0[P]. Compared to the mode OP1, the transmitter TX[0] has signals on a clock lane and a data lane thereof interchanged. As a result, the lane L0[0] serving as a data lane in the mode OP1 acts as a clock lane in the mode OP3, while the lane L0[P] serving as a clock lane in the mode OP1 acts as a data lane in the mode OP3. The receiver 104 can select the lane LA[0] as a clock lane for receiving the clock signal C0. P of the remaining lanes LA[1]-LA[N−1] can serve as P data lanes for receiving the data signals $D0_0$-$D0_{(P-1)}$. By interchanging each of the lanes LA[0] and LA[N−1] between a data lane and a clock lane, the integrated circuit 110 can support the transmitter TX[0] which is capable of interchanging lanes between clock and data lanes.

To facilitate understanding of the present disclosure, some embodiments are given in the following for further description of a clock forward interface receiver utilizing a lane interchange scheme. Those skilled in the art should appreciate that other embodiments employing the lane interchange scheme described with reference to the integrated circuit 110 or the receiver 104 shown in FIG. 1 are also within the contemplated scope of the present disclosure.

Figure 3:
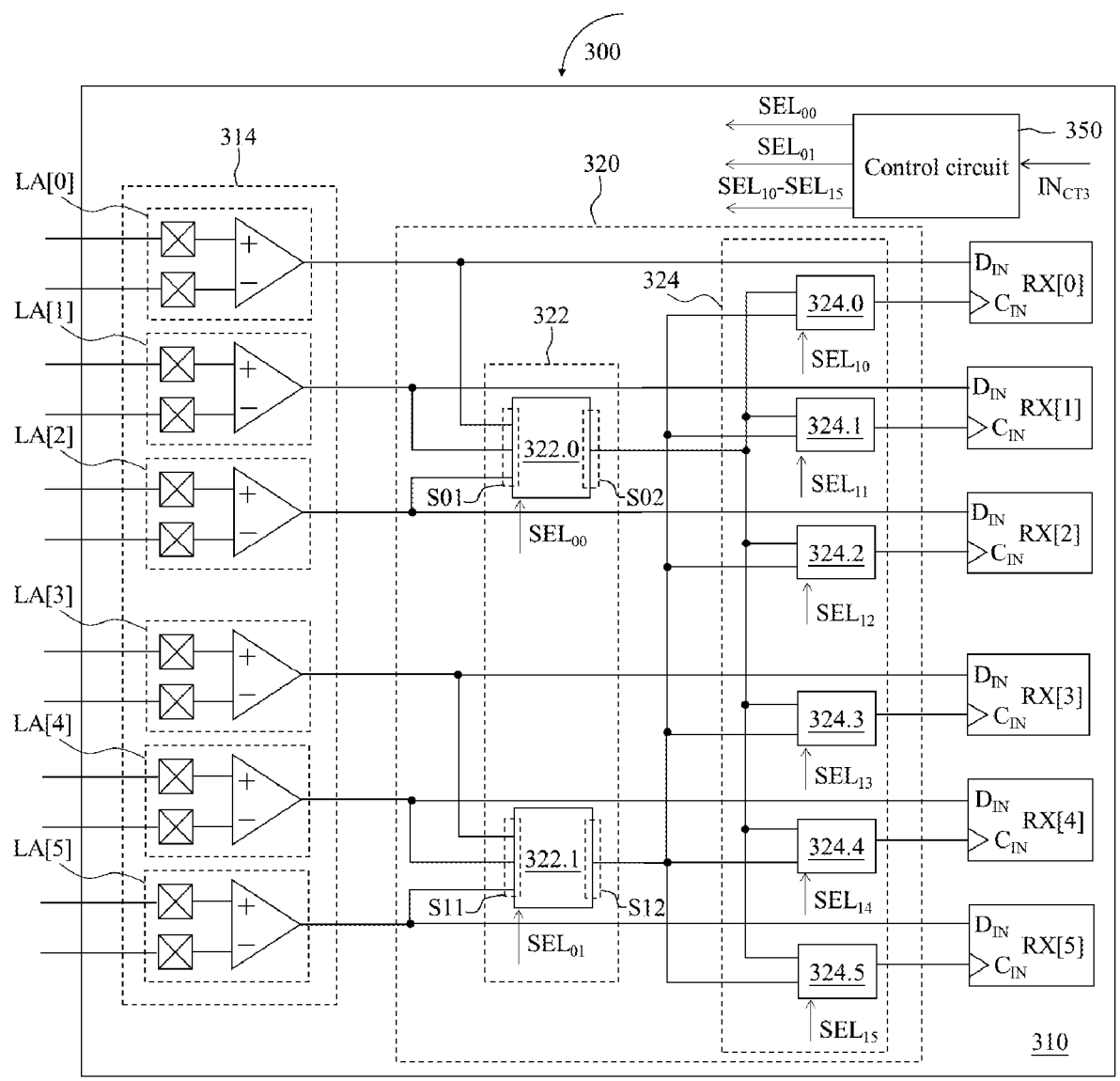
FIG. 3 illustrates an implementation of the integrated circuit shown in FIG. 1 in accordance with some embodiments of the present disclosure.

FIG. 3 illustrates an implementation of the integrated circuit 110 shown in FIG. 1 in accordance with some embodiments of the present disclosure. The integrated circuit 310 is disposed in a physical layer of a receiver 300, such as a physical medium attachment layer (PMA) in the physical layer, to receive clock and data information sent from one or more transmitters on a transmitter side. The integrated circuit 310 can represent an embodiment of the integrated circuit 110 shown in FIG. 1 which includes six lanes interchangeable between clock and data lanes, i.e. N=6. In the present embodiment, the integrated circuit 310 can include the sampling circuits RX[0]-RX[5] shown in FIG. 1, a multi-lane interface 314 and a lane selection circuit 320. The multi-lane interface 314 and the lane selection circuit 320 can represent embodiments of the multi-lane interface 114 and the lane selection circuit 120 shown in FIG. 1, respectively.

In the present embodiment, each of the lanes LA[0]-LA[5] in the multi-lane interface 314 can be implemented using a two-wire lane, which is a differential lane including a pair of signal pins and an amplifier. In some embodiments, each of the lanes LA[0]-LA[5] can be implemented using other types of lanes, such as a single-wire lane or a lane having more than two wires, without departing from the scope of the present disclosure.

The lane selection circuit 320 is configured to select one or more of the lanes LA[0]-LA[5] as one or more clock lanes. The lane selection circuit 320 may include a plurality of selection stages 322 and 324, which can represent embodiments of the selection stages 122 and 124 shown in FIG. 1, respectively. In the present embodiment, the selection stage 322 can be configured to couple one or two lanes to the selection stage 324 in response to a mode of the integrated circuit 310. The selection stage 322 includes, but is not limited to, a plurality of lane selection units 322.0 and 322.1. The lane selection unit 322.0 is configured to couple one of the lanes LA[0]-LA[2] from an input side S01 to an output side S02 according to a clock select signal $SEL_{00}$. The lane selection unit 322.1 is configured to couple one of the lanes LA[3]-LA[5] from an input side S11 to an output side S12 according to a clock select signal $SEL_{01}$.

The selection stage 324 can be configured to distribute a signal on each lane selected by the selection stage 322 to more than one sampling circuit. The selection stage 324 includes, but is not limited to, a plurality of lane selection units 324.0-324.5. Each of the lane selection units 324.0-324.5 is configured to selectively couple one of the output sides S02 and S12 to a corresponding sampling circuit according to a corresponding clock select signal, i.e. one of clock select signals $SEL_{10}$-$SEL_{15}$. The description associated with the clock select signals $SEL_{00}$, $SEL_{01}$ and $SEL_{10}$-$SEL_{15}$ is provided later.

The clock inputs $C_{IN}$ of the sampling circuits RX[0]-RX[5] are coupled to outputs of the lane selection units 324.0-324.5, respectively. The data inputs $D_{IN}$ of the sampling circuits RX[0]-RX[5] are coupled to the lanes LA[0]-LA[5], respectively. In the present embodiment, each of the sampling circuits RX[0]-RX[5] can be implemented using a flip-flop, such as a D-type flip-flop, for data sampling. Those skilled in the art should appreciate that each of the sampling circuits RX[0]-RX[5] can be implemented using other types of sampling circuits without departing from the scope of the present disclosure.

Figure 4A:
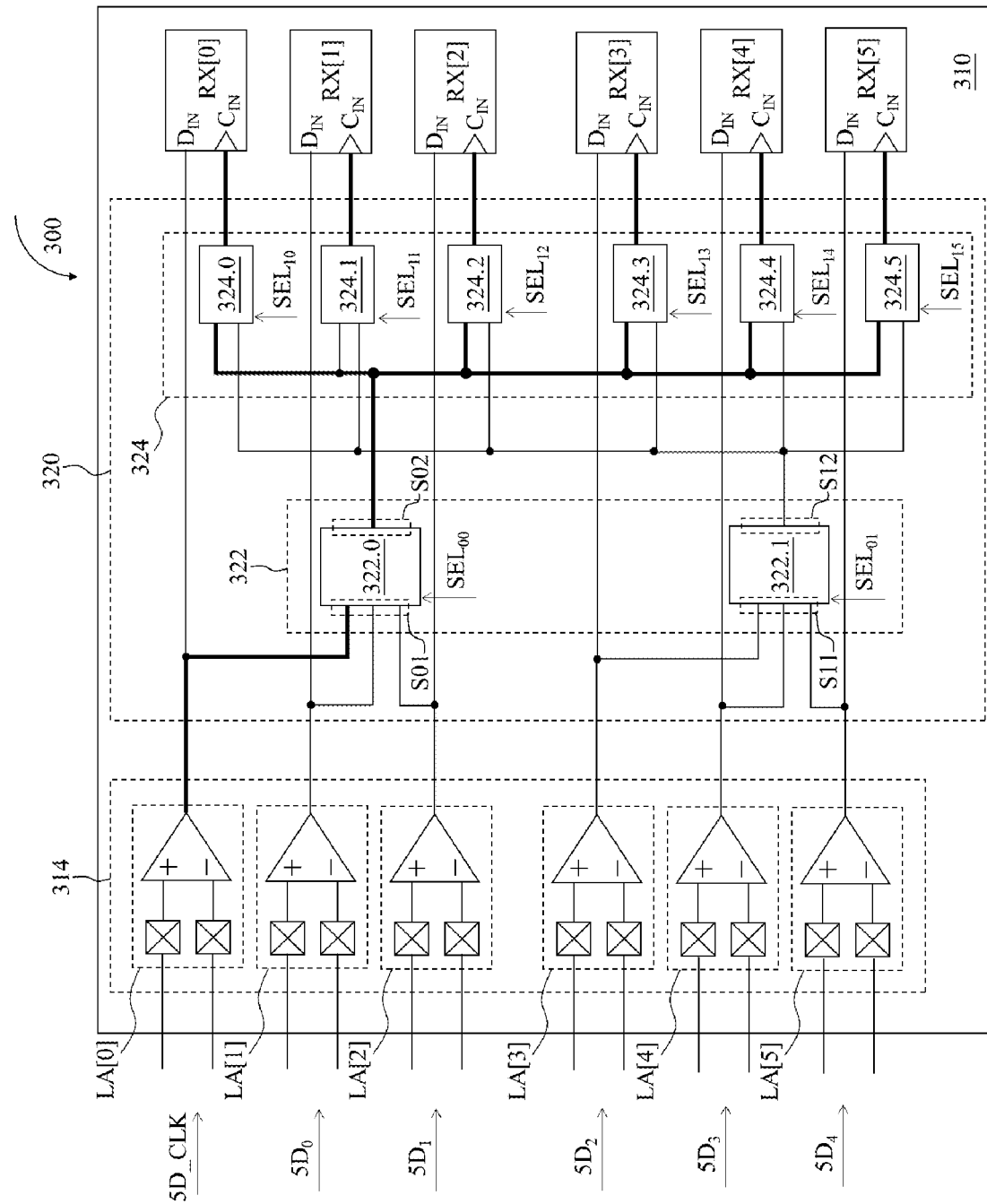
FIG. 4A through FIG. 4C illustrate operations of the integrated circuit shown in FIG. 3 in accordance with some embodiments of the present disclosure.
Figure 4B:
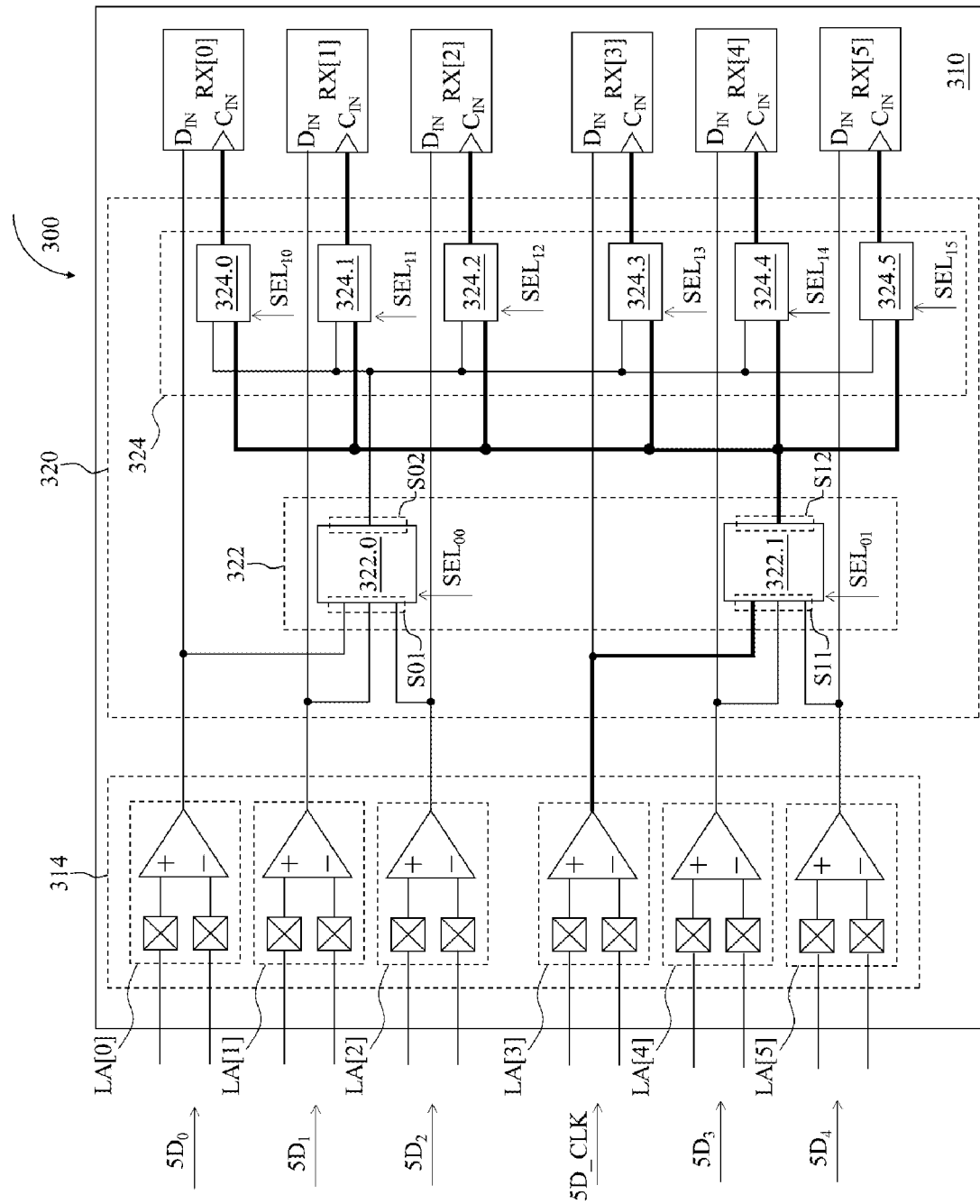
Figure 4C:
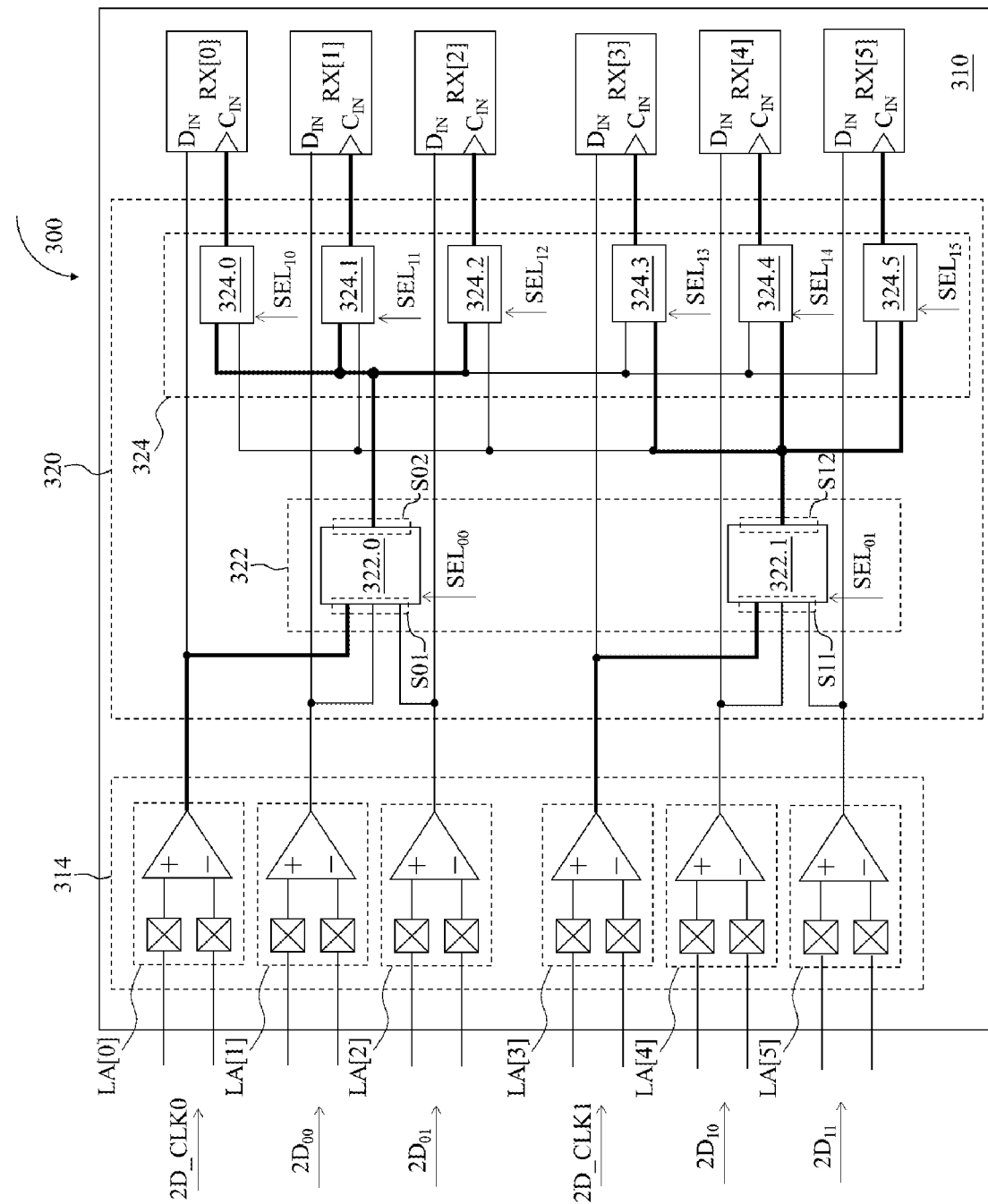

FIGS. 4A-4C illustrate operations of the integrated circuit 310 shown in FIG. 3 in accordance with some embodiments of the present disclosure. In the embodiments shown in FIGS. 4A and 4B, the integrated circuit 310 operates in modes similar to the mode OP1/OP3 shown in FIG. 2A/2C to receive a single clock signal from the multi-lane interface 314. The lane selection circuit 320 can select one of the lanes LA[0]-LA[5] as a clock lane to receive the clock signal. The lane selection circuit 320 is configured to couple a signal on the clock lane, i.e. the clock signal, to each of the sampling circuits RX[0]-RX[5]. In the embodiment shown in FIG. 4C, the integrated circuit 310 operates in a mode similar to the mode OP2 shown in FIG. 2B to receive multiple clock signals from the multi-lane interface 314. The lane selection circuit 320 can select two of the lanes LA[0]-LA[5] as two clock lanes to receive the clock signals. The lane selection circuit 320 is configured to couple a signal on each clock lane to one or more of the sampling circuits RX[0]-RX[5].

Referring first to FIG. 4A, the integrated circuit 310 can support a "5D1C" lane configuration where a clock signal 5D_CLK is inputted to one of the lanes LA[0]-LA[2], such as the lane LA[0] in this embodiment. Five data signals $5D_0$-$5D_4$ are inputted to the remaining five lanes. The lane selection unit 322.0 is configured to select the lane LA[0] as a clock lane by coupling the lane LA[0] to the output side S02 according to the clock select signal $SEL_{00}$. The lanes LA[1] and LA[2] are uncoupled from the output side S02. In addition, each of the lane selection units 324.0-324.5 is configured to couple the output side S02 of the lane selection unit 322.0 to a corresponding sampling circuit according to a corresponding clock select signal. As a result, the clock signal 5D_CLK is sent to the respective clock inputs C of the sampling circuits RX[0]-RX[5]. The sampling circuits RX[1]-RX[5], respectively coupled to the lanes LA[1]-LA[5], can sample the data signals $5D_0$-$5D_4$ according to the clock signal 5D_CLK.

Referring to FIG. 4B, the integrated circuit 310 can support another "5D1C" lane configuration where the clock signal 5D_CLK is inputted to one of the lanes LA[3]-LA[5], such as the lane LA[3] in this embodiment. The data signals $5D_0$-$5D_4$ are inputted to the remaining five lanes. The lane selection unit 322.1 may select the lane LA[3] as a clock lane by coupling the lane LA[3] to the output side S12 according to the clock select signal $SEL_{01}$. Each of the lane selection units 324.0-324.5 can couple the output side S12 of the lane selection unit 322.1 to a corresponding sampling circuit. As a result, the sampling circuits RX[0]-RX[2], RX[4] and RX[5], which are respectively coupled to the lanes LA[0]-LA[2], LA[4] and LA[5], can sample the data signals $5D_0$-$5D_4$ according to the clock signal 5D_CLK.

Referring to FIG. 4C, the integrated circuit 310 can act as two circuit interfaces, each of which supports a "2D1C" lane configuration where two lanes serve as data lanes and one lane serves as a clock lane. In the present embodiment, a clock signal 2D_CLK0 is inputted to one of the lanes LA[0]-LA[2], such as the lane LA[0], and associated data signals $2D_{00}$ and $2D_{01}$ are inputted to remaining two lanes. A clock signal 2D_CLK1 is inputted to one of the lanes LA[3]-LA[5], such as the lane LA[3], and associated data signals $2D_{10}$ and $2D_{11}$ are inputted to remaining two lanes.

The lane selection unit 322.0 is configured to couple the lane LA[0] to the output side S02 according to the clock select signal $SEL_{00}$. Each of the lane selection units 324.0-324.2 is configured to couple the output side S02 to a corresponding sampling circuit according to a corresponding clock select signal. As a result, the sampling circuits RX[1] and RX[2], respectively coupled to the lanes LA[1] and LA[2], can sample the data signals $2D_{00}$ and $2D_{01}$ according to the clock signal 2D_CLK0. Similarly, the lane selection unit 322.1 is configured to couple the lane LA[3] to the output side S12 according to the clock select signal $SEL_{01}$. Each of the lane selection units 324.3-324.5 is configured to couple the output side S12 to a corresponding sampling circuit according to a corresponding clock select signal. The sampling circuits RX[4] and RX[5], respectively coupled to the lanes LA[4] and LA[5], can sample the data signals $2D_{10}$ and $2D_{11}$ according to the clock signal 2D_CLK1. As each of the clock select signals $SEL_{10}$-$SEL_{12}$ can have a signal level/value different from that of each of the clock select signals $SEL_{13}$-$SEL_{15}$, the lane selection units 324.0-324.5 can distribute the different clock signals 2D_CLK0 and 2D_CLK1 to the sampling circuits RX[0]-RX[5].

With the use of the selection operation described with reference to FIG. 4A and FIG. 4B, the selection stage 322 and the selection stage 324 shown in FIG. 3 can act as a 6-to-1 multiplexer and a clock tree, respectively, to support the "5D1C" lane configurations. Also, with the use of the selection operation described with reference to FIG. 4C, the selection stage 322 shown in FIG. 3 can act as two 3-to-1 multiplexers, and the selection stage 324 shown in FIG. 3 can act as two clock trees, thereby supporting the "2D1C" lane configurations in bifurcation modes. As a result, the lane selection circuit 320 shown in FIG. 3 can support one or more transmitters by operating as a 6-to-M multiplexer and M clock trees, where M can be equal to one or two depending on a mode of the integrated circuit 310.

Please note that the circuit structures of the selection stages 322 and 324 shown in FIG. 3 are provided for illustrative purposes, and are not intended to limit the scope of the present disclosure. In some embodiments, the selection stage 322 can be implemented by other circuit structures to provide multiplexer operations. In some embodiments, the selection stage 324 can be implemented using other circuit structures to construct one or more clock trees. In some embodiments, a signal on each selected clock lane, e.g. a clock signal, may be uncoupled from a data input $D_{IN}$ of each sampling circuit. For example, when selected as a clock lane, the lane LA[0] shown in FIG. 3 may be uncoupled from the data input $D_{IN}$ of each sampling circuit.

In some embodiments, the clock select signals $SEL_{10}$-$SEL_{12}$ can be implemented using a same clock select signal, or can have a same signal value. In some embodiments, the clock select signals $SEL_{13}$-$SEL_{15}$ can be implemented using a same clock select signal, or can have a same signal value. Such modifications and alternatives also within the contemplated scope of the present disclosure.

Figure 5A:
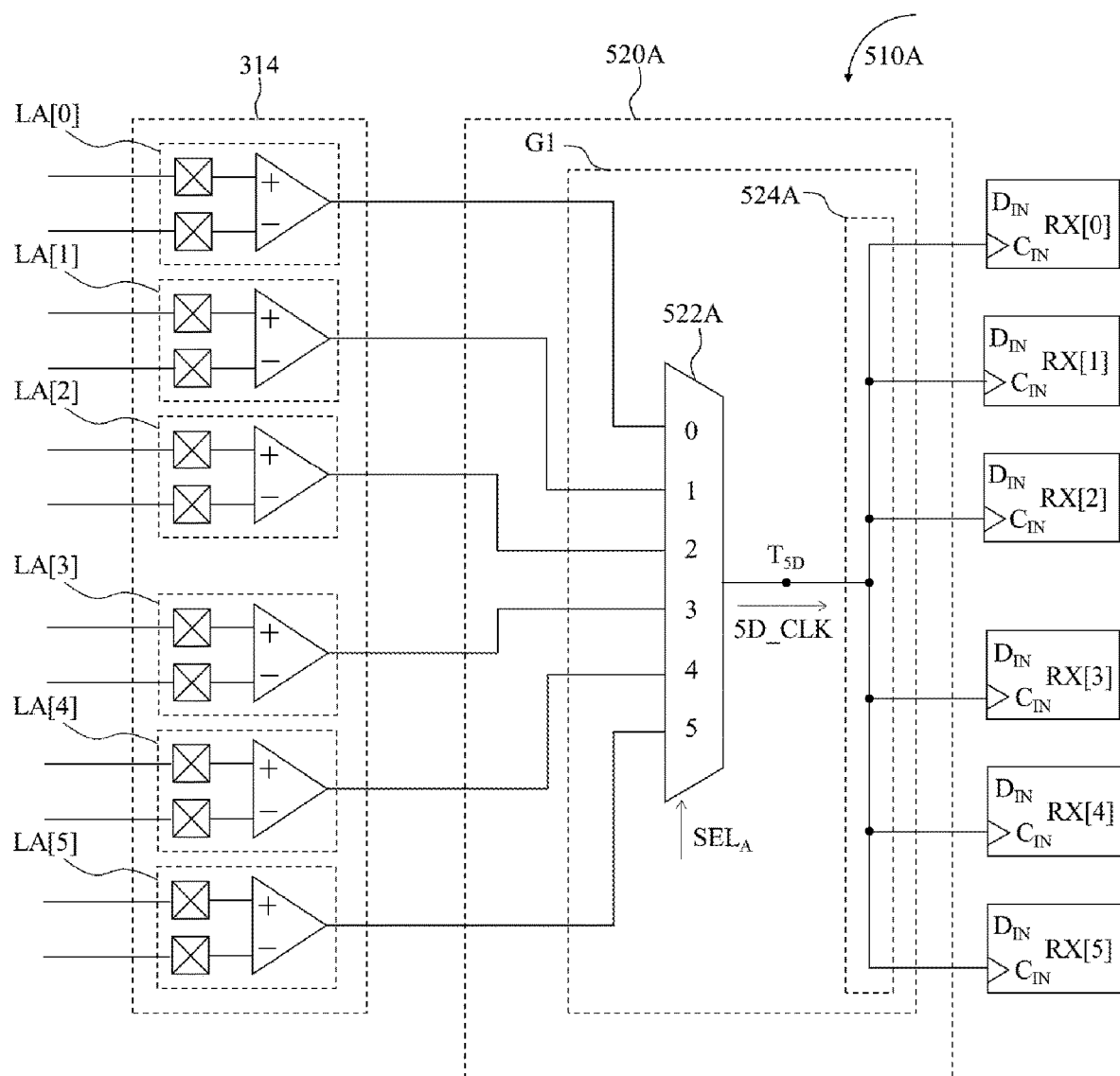
FIG. 5A through FIG. 5C illustrate other implementations of the integrated circuit shown in FIG. 1 in accordance with some embodiments of the present disclosure.
Figure 5B:
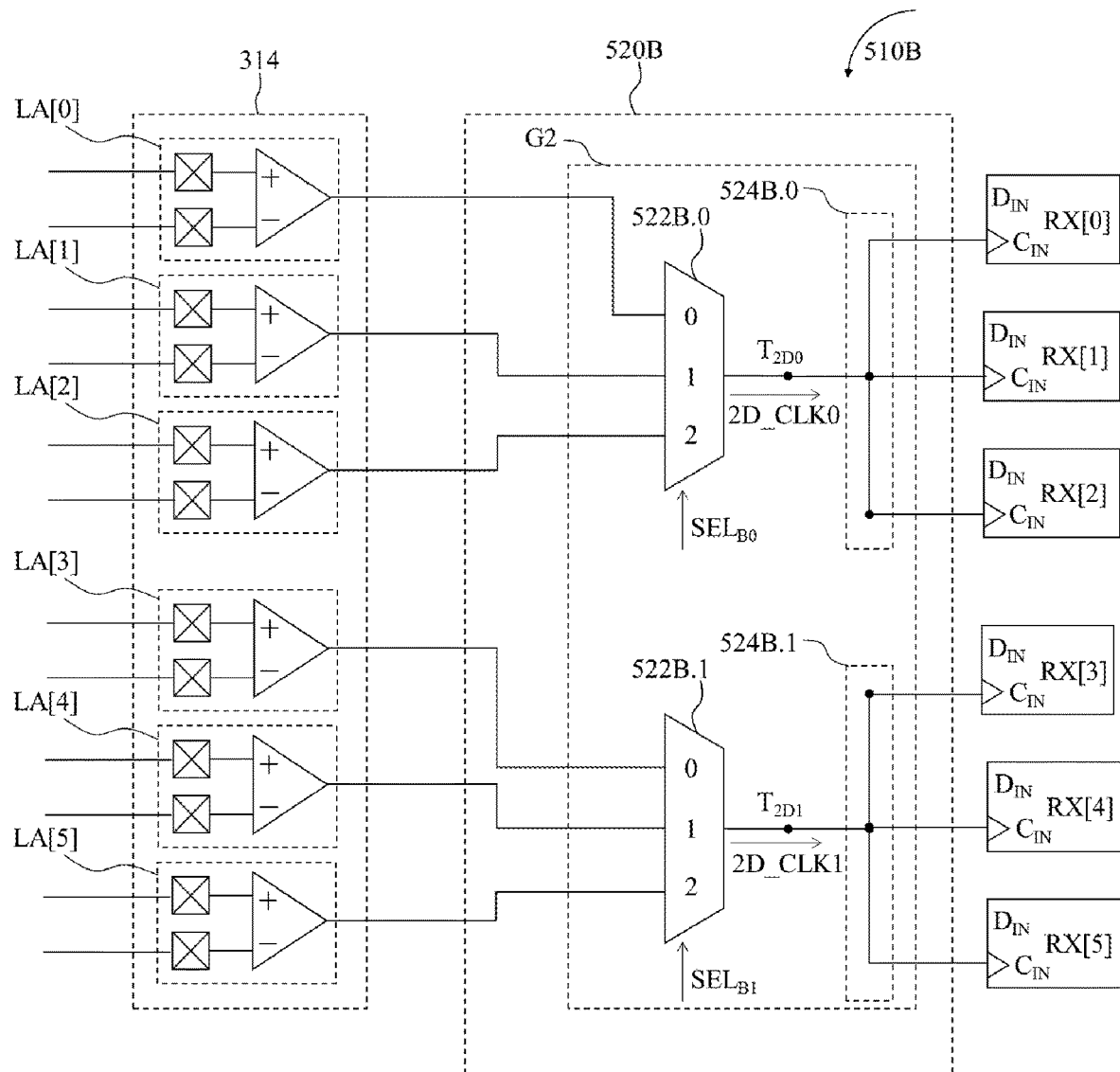
Figure 5C:
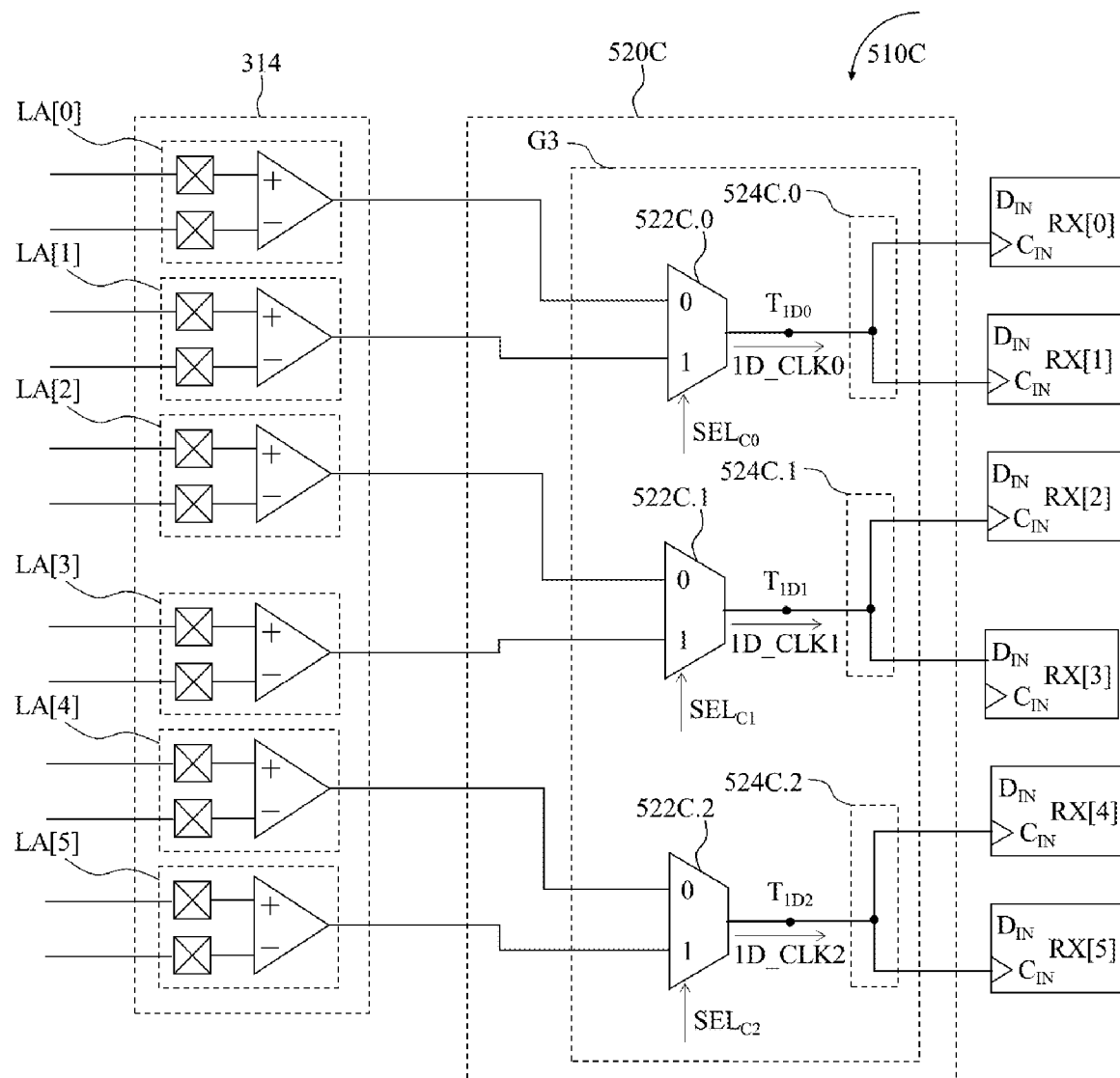

FIGS. 5A-5C illustrate other implementations of the integrated circuit 110 shown in FIG. 1 in accordance with some embodiments of the present disclosure. Each of the integrated circuits 510A-510C shown in FIG. 5A-5C can represent an embodiment of the integrated circuit 110 shown in FIG. 1 which includes six lanes interchangeable between clock and data lanes, i.e. N=6. In these embodiments, the lane selection circuit 120 shown in FIG. 1 can be implemented using different clock tree groups to support different lane configurations on a transmitter side. Each clock tree group includes at least one clock tree circuit, and a clock tree circuit includes a multiplexer and a clock tree.

Referring first to FIG. 5A, the structure of the integrated circuit 510A is similar/identical to that of the integrated circuit 310 shown in FIG. 3 except for a lane selection circuit 520A. The lane selection circuit 520A can provide circuit operations similar/identical to those of the lane selection circuit 320 described with reference to FIG. 4A/4B. In the present embodiment, the lane selection circuit 520A can be implemented using a clock tree group G1. The clock tree group G1 has one clock tree circuit, which includes a multiplexer 522A, i.e. a 6-to-1 multiplexer, and a clock tree 524A. The multiplexer 522A is configured to select one of the lanes LA[0]-LA[5] as a clock lane according to a clock select signal $SEL_A$, thereby outputting a signal on the selected clock lane from an output terminal $T_{5D}$. The clock tree 524A is configured to distribute the signal at the output terminal $T_{5D}$ to each of the sampling circuits RX[0]-RX[5]. Please note that the circuit structure of the selection stage 322 shown in FIG. 4A/4B can represent an embodiment of the multiplexer 522A. Additionally, or alternatively, the circuit structure of the selection stage 324 shown in FIG. 4A/4B can represent an embodiment of the clock tree 524A. As those skilled in the art can understand operation of the lane selection circuit 520A shown in FIG. 5A in a "5D1C" lane configuration after reading paragraphs directed to FIG. 3, FIG. 4A and FIG. 4B, further description associated with lane selection is omitted here for brevity.

Referring to FIG. 5B, the structure of the integrated circuit 510B is similar/identical to that of the integrated circuit 310 shown in FIG. 3 except for a lane selection circuit 520B. The lane selection circuit 520B can provide circuit operations similar/identical to those of the lane selection circuit 320 described with reference to FIG. 4C. In the present embodiment, the lane selection circuit 520B can be implemented using a clock tree group G2 having two clock tree circuits. One clock tree circuit includes a multiplexer 522B.0 and a clock tree 524B.0, and the other clock tree circuit includes a multiplexer 522B.1 and a clock tree 524B.1. The multiplexer 522B.0, i.e. a 3-to-1 multiplexer, is configured to select one of the lanes LA[0]-LA[2] as a clock lane according to a clock select signal $SEL_{B0}$. The clock tree 524B.0 is configured to distribute a signal at an output terminal $T_{2D0}$ to each of the sampling circuits RX[0]-RX[2]. The multiplexer 522B.1, i.e. a 3-to-1 multiplexer, is configured to select one of the lanes LA[3]-LA[5] as a clock lane according to a clock select signal $SEL_{B1}$. The clock tree 524B.1 is configured to distribute a signal at an output terminal $T_{2D1}$ to each of the sampling circuits RX[3]-RX[5]. Please note that the circuit structure of the selection stage 322 shown in FIG. 4C can represent an embodiment of the multiplexers 522B.0 and 522B.1. Additionally, or alternatively, the circuit structure of the selection stage 324 shown in FIG. 4C can represent an embodiment of the clock trees 524B.0 and 524B.1. As those skilled in the art can understand operation of the lane selection circuit 520B shown in FIG. 5B in "2D1C" lane configurations after reading paragraphs directed to FIG. 3 and FIG. 4C, further description associated with lane selection is omitted here for brevity.

Referring to FIG. 5C, the structure of the integrated circuit 510C is similar/identical to that of the integrated circuit 310 shown in FIG. 3 except for a lane selection circuit 520C. The lane selection circuit 520C can be implemented using a clock tree group G3 having three clock tree circuits, thereby supporting a transmitter side where three clock lanes and three associated data lanes are arranged. In the present embodiment, the lane selection circuit 520C includes a plurality of multiplexers 522C.0-522C.2, i.e. three 2-to-1 multiplexers, and a plurality of clock trees 524C.0-524C.2. The multiplexer 522C.0 is configured to select one of the lanes LA[0] and LA[1] as a clock lane according to a clock select signal $SEL_{C0}$. The multiplexer 522C.1 is configured to select one of the lanes LA[2] and LA[3] as a clock lane according to the clock select signal $SEL_{C1}$. The multiplexer 522C.2 is configured to select one of the lanes LA[4] and LA[5] as a clock lane according to the clock select signal $SEL_{C2}$. The clock tree 524C.0 is configured to distribute a signal at an output terminal $T_{1D0}$ to each of the sampling circuits RX[0] and RX[1]. The clock tree 524C.1 is configured to distribute a signal at an output terminal $T_{1D1}$ to each of the sampling circuits RX[2] and RX[3]. The clock tree 524C.2 is configured to distribute a signal at an output terminal $T_{1D2}$ to each of the sampling circuits RX[4] and RX[5].

For example, the multiplexers 522C.0-522C.2 can select the lanes LA[0], LA[2] and LA[4] as clock lanes, respectively. As a result, the sampling circuit RX[1] can sample a signal on the lane LA[1] according to a signal on the lane LA[0]. The sampling circuit RX[3] can sample a signal on the lane LA[3] according to a signal on the lane LA[2]. The sampling circuit RX[5] can sample a signal on the lane LA[5] according to a signal on the lane LA[4]. The integrated circuit 510C can be split into three interfaces, each of which supports a "1D1C" lane configuration where one lane is used as a clock lane and another lane is used as an associated data lane.

Figure 6:
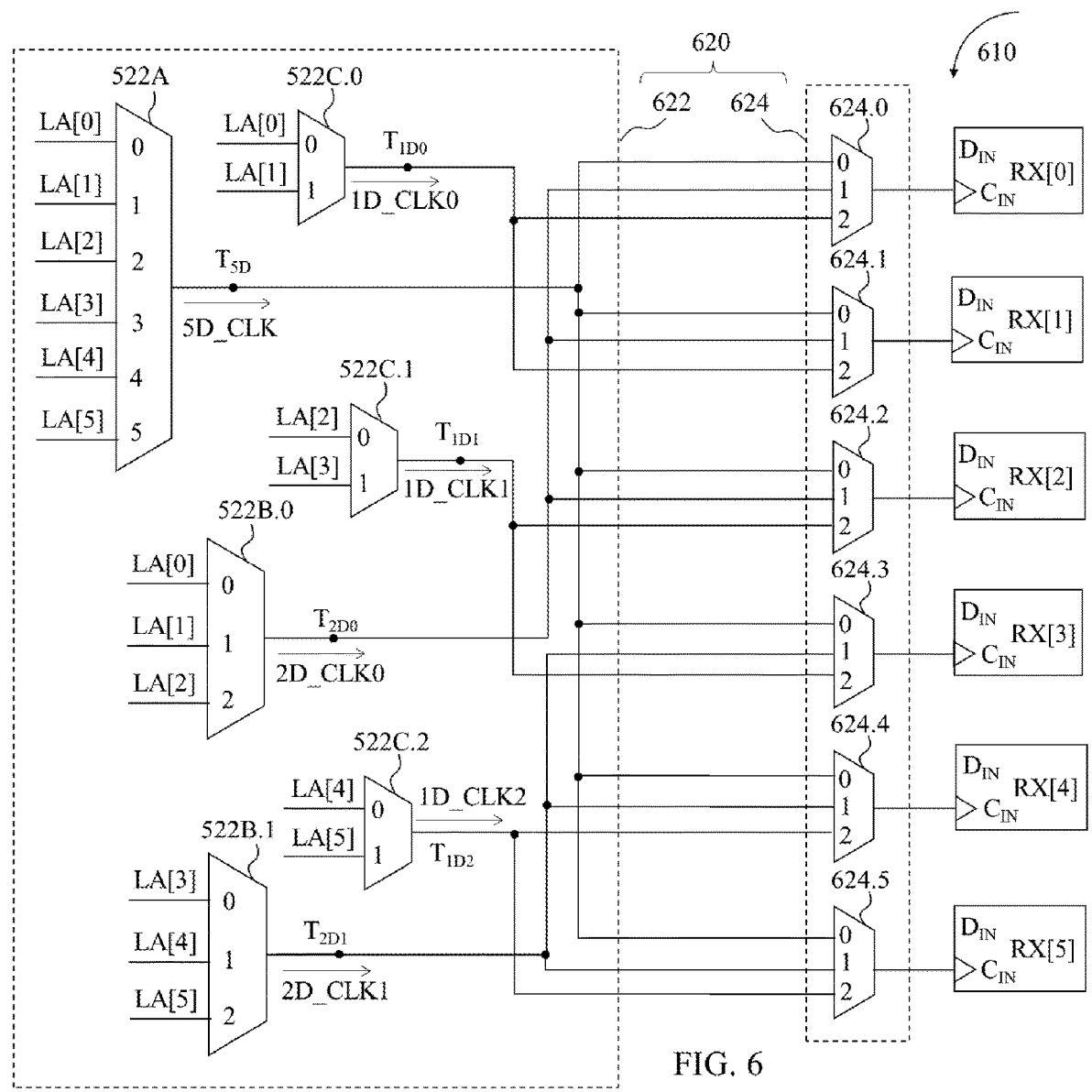
FIG. 6 illustrates another implementation of the integrated circuit shown in FIG. 1 in accordance with some embodiments of the present disclosure.

FIG. 6 illustrates another implementation of the integrated circuit 110 shown in FIG. 1 in accordance with some embodiments of the present disclosure. The integrated circuit 610 can represent an embodiment of the integrated circuit 110 shown in FIG. 1 which includes six lanes interchangeable between clock and data lanes, i.e. N=6. In the present embodiment, the integrated circuit 610 may employ the clock tree groups G1-G3 shown in FIGS. 5A-5C to support different lane configurations. The integrated circuit 610 includes the multi-lane interface 314 and the sampling circuits RX[0]-RX[5] shown in FIG. 3, and a lane selection circuit 620. The lane selection circuit 620 can represent an embodiment of the lane selection circuit 120 shown in FIG. 1, and include a plurality of selection stages 622 and 624.

The selection stage 622 may include the multiplexer 522A of the clock tree group G1 shown in FIG. 5A, the multiplexers 522B.0 and 522B.1 of the clock tree group G2 shown in FIG. 5B, and the multiplexers 522C.0-522C.2 of the clock tree group G3 shown in FIG. 5C. The selection stage 624 may include a plurality of multiplexers 624.0-642.5. The multiplexer 624.0 is configured to couple one of the output terminals $T_{5D}$, $T_{2D0}$ and $T_{1D0}$ to the clock input $C_{IN}$ of the sampling circuit RX[0]. The multiplexer 624.1 is configured to couple one of the output terminals $T_{5D}$, $T_{2D0}$ and $T_{1D0}$ to the clock input $C_{IN}$ of the sampling circuit RX[1]. The multiplexer 624.2 is configured to couple one of the output terminals $T_{5D}$, $T_{2D0}$ and $T_{1D1}$ to the clock input $C_{IN}$ of the sampling circuit RX[2]. The multiplexer 624.3 is configured to couple one of the output terminals $T_{5D}$, $T_{2D1}$ and $T_{1D1}$ to the clock input $C_{IN}$ of the sampling circuit RX[3]. The multiplexer 624.4 is configured to couple one of the output terminals $T_{5D}$, $T_{2D1}$ and $T_{1D2}$ to the clock input $C_{IN}$ of the sampling circuit RX[4]. The multiplexer 624.5 is configured to couple one of the output terminals $T_{5D}$, $T_{2D1}$ and $T_{1D2}$ to the clock input $C_{IN}$ of the sampling circuit RX[5].

In a mode where the integrated circuit 610 is configured to support a "5D1C" lane configuration, each of the multiplexers 624.0-642.5 is configured to couple the output terminal $T_{5D}$ to a corresponding sampling circuit such that the clock signal 5D_CLK at the output terminal $T_{5D}$ can be distributed to each sampling circuit. For example, the multiplexer 522A may couple the lane LA[0] to the output terminal $T_5D$ according to the clock select signal $SEL_A$. The remaining lanes LA[1]-LA[5] can serve as data lanes. The sampling circuits RX[1]-RX[5], respectively coupled to the lanes LA[1]-LA[5], can perform data sampling according to the clock signal 5D_CLK. Please note that the multiplexers 624.0-642.5, capable of acting as a clock tree for distributing the clock signal 5D_CLK, can be used to implement the clock tree 524A in the clock tree group G1 shown in FIG. 5A.

In another mode where the integrated circuit 610 is configured to support "2D1C" lane configurations with bifurcation, each of the multiplexers 624.0-642.2 is configured to couple the output terminal $T_{2D0}$ to a corresponding sampling circuit such that the clock signal 2D_CLK0 at the output terminal $T_{2D0}$ can be distributed to each of the sampling circuits RX[0]-RX[2]. Each of the multiplexers 624.3-642.5 is configured to couple the output terminal $T_{2D1}$ to a corresponding sampling circuit such that the clock signal 2D_CLK1 at the output terminal $T_{2D1}$ can be distributed to each of the sampling circuits RX[3]-RX[5]. The multiplexers 624.0-642.5 can be used to implement the clock trees 524B.0 and 524B.1 in the clock tree group G2 shown in FIG. 5B. As a result, the sampling circuits RX[0]-RX[5] can be divided into two groups of sampling circuits. A physical layer where the integrated circuit 610 is disposed can operate as two separated physical layers, one of which includes the lanes LA[0]-LA[2] and the sampling circuits RX[0]-RX[2], and the other includes the lanes LA[3]-LA[5] and the sampling circuits RX[3]-RX[5].

In still another mode where the integrated circuit 610 is configured to support "1D1C" lane configurations with bifurcation, each of the multiplexers 624.0 and 624.1 is configured to couple the output terminal $T_{1D0}$ to a corresponding sampling circuit such that the clock signal 1D_CLK0 at the output terminal $T_{1D0}$ can be distributed to each of the sampling circuits RX[0] and RX[1]. Similarly, each of the multiplexers 624.2 and 624.3 is configured to couple the output terminal $T_{1D1}$ to a corresponding sampling circuit such that the clock signal 1D_CLK1 at the output terminal $T_{1D1}$ can be distributed to each of the sampling circuits RX[2] and RX[3]. Each of the multiplexers 624.4 and 624.5 is configured to couple the output terminal $T_{1D2}$ to a corresponding sampling circuit such that the clock signal 1D_CLK2 at the output terminal $T_{1D2}$ can be distributed to each of the sampling circuits RX[4] and RX[5]. The multiplexers 624.0-642.5 can be used to implement the clock trees 524C.0-524C.2 in the clock tree group G3 shown in FIG. 5C. As a result, the sampling circuits RX[0]-RX[5] can be divided into three groups of sampling circuits. A physical layer where the integrated circuit 610 is disposed can operate as three separated physical layers to support three transmitters.

With the use of the multiplexers 522A, 522B.0, 522B.1 and 522C.0-522C.2, the selection stage 622 can act as a 6-to-M multiplexer, where M may be equal to one, two or three depending on a mode of the integrated circuit 610. Also, with the use of the multiplexers 624.0-642.5, the selection stage 624 can act as M clock trees, where M may be equal to one, two or three depending on a mode of the integrated circuit 610. As a result, the integrated circuit 610 can divide the lanes LA[0]-LA[5] into one or more groups of lanes, each of which includes clock and data lanes, to support one or more transmitters.

The circuit structures and operations described with reference to FIG. 6 are provided for illustrative purposes, and are not intended to limit the scope of the present disclosure. In some embodiments, the integrated circuit 610 may operate in a bifurcation mode to support a "3D1C" lane configuration and "1D1C" lane configuration concurrently. For example, each of the multiplexers 624.0-624.3 is configured to couple the output terminal $T_{5D}$ to a corresponding sampling circuit such that the clock signal 5D_CLK at the output terminal $T_{5D}$ can be distributed to each of the sampling circuits RX[0]-RX[3]. Each of the multiplexers 624.4 and 624.5 is configured to couple the output terminal $T_{1D2}$ to a corresponding sampling circuit such that the clock signal 1D_CLK2 at the output terminal $T_{1D2}$ can be distributed to each of the sampling circuits RX[4] and RX[5]. As a result, a physical layer where the integrated circuit 610 is disposed can be split into two separated physical layers, thereby supporting two transmitters having different numbers of data lanes.

In some embodiments, a lane serving as a data lane may not be used in data transmission. For example, when configured to support a "5D1C" lane configuration, the integrated circuit 610 may use five or less data lanes to receive data information sent from a transmitter side. The number of data lanes in use may depend on the number of data signals sent to the multi-lane interface 314.

In some embodiments, the selection stage 622 can be implemented using other multiplexer circuits to thereby select one or more lanes in response to a mode of the integrated circuit 610. In some embodiments, the selection stage 624 can be implemented using other clock tree structures to thereby distribute one or more clock signals in response to a mode of the integrated circuit 610. Such modifications and alternatives also within the contemplated scope of the present disclosure.

Figure 7:
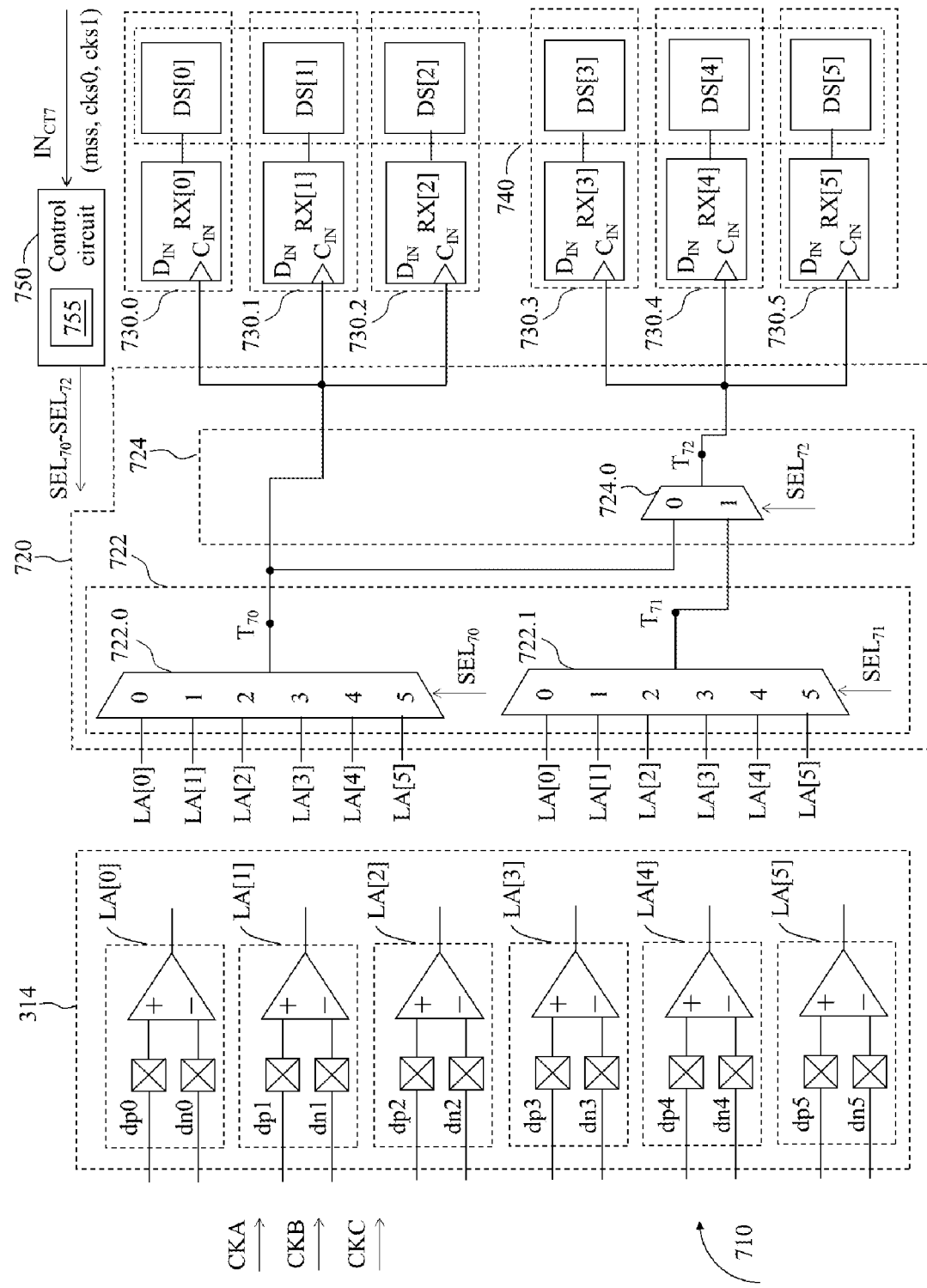
FIG. 7 illustrates another implementation of the integrated circuit shown in FIG. 1 in accordance with some embodiments of the present disclosure.

FIG. 7 illustrates another implementation of the integrated circuit 110 shown in FIG. 1 in accordance with some embodiments of the present disclosure. The integrated circuit 710 can represent an embodiment of the integrated circuit 110 shown in FIG. 1 which includes six lanes interchangeable between clock and data lanes, i.e. N=6. In the present embodiment, the integrated circuit 710 can be disposed in a physical medium attachment layer (PMA) of a physical layer to perform serial-to-parallel conversion.

The integrated circuit 710 includes the multi-lane interface 314 shown in FIG. 3, a lane selection circuit 720 and a plurality of serial-to-parallel (S2P) converters 730.0-730.5. The lane selection circuit 720 can represent an embodiment of the lane selection circuit 120 shown in FIG. 1, and include a plurality of selection stages 722 and 724. The selection stage 722 may include a plurality of multiplexers 722.0 and 722.1. The multiplexer 722.0 is configured to couple the lanes LA[0]-LA[5] to an output terminal $T_{70}$ according to a clock select signal $SEL_{70}$. The multiplexer 722.1 is configured to couple the lanes LA[0]-LA[5] to an output terminal $T_{71}$ according to a clock select signal $SEL_{71}$. The selection stage 724 can be implemented to include a multiplexer 724.0, which is configured to couple one of the output terminals $T_{70}$ and $T_{71}$ to an output terminal $T_{72}$ according to a clock select signal $SEL_{72}$.

Each of the S2P converters 730.0-730.5 is configured to output a multi-bit parallel output signal. The multi-bit parallel output signal may be a parallel data signal, a byte data signal, a parallel clock signal or a byte clock signal. In the present embodiment, each S2P converter includes a sampling circuit and a deserializer, i.e. one of the sampling circuits RX[0]-RX[5] shown in FIG. 3 and one of deserializers DS[0]-DS[5]. The deserializers DS[0]-DS[5] can serve as an output circuit 740 configured to output one or more clock signals according to the sampling result SR of the sampling circuits RX[0]-RX[5].

In a mode where the integrated circuit 710 is configured to support a "5D1C" lane configuration, the multiplexer 724.0 is configured to couple the output terminal $T_{70}$ to the output terminal $T_{72}$. When the multiplexer 722.0 selects one of the lanes LA[0]-LA[5] as a clock lane, a signal on the clock lane can be coupled to the output terminal $T_{70}$, and distributed to the respective clock inputs $C_{IN}$ of the sampling circuits RX[0]-RX[5]. For example, the multiplexer 722.0 may select the lane LA[0] as a clock lane, and each of the sampling circuits RX[1]-RX[5] can perform data sampling according to a same clock signal, i.e. a signal on the lane LA[0]. The deserializer DS[0] may output a clock signal, i.e. a parallel clock signal, according to the sampling result SR. Each of the deserializers DS[1]-DS[5] may output a data signal, i.e. a parallel data signal, according to the sampling result SR. Please note that, in this mode, the multiplexers 722.0 and 724.0 can represent an implementation of the clock tree group G1 shown in FIG. 5A.

In another mode where the integrated circuit 710 is configured to support "2D1C" lane configurations with bifurcation, the multiplexer 724.0 is configured to couple the output terminal $T_{71}$ to the output terminal $T_{72}$. When the multiplexer 722.0 selects one of the lanes LA[0]-LA[5] as a clock lane, the multiplexer 722.1 can select another of the lanes LA[0]-LA[5] as a clock lane. As a result, signals on the remaining lanes can be sampled according to signals on the selected clock lanes. Two of the deserializers DS[0]-DS[5] may output two clock signals according to the sampling result SR. For example, the multiplexer 722.0 may select the lane LA[0] as a clock lane, and the sampling circuits RX[1] and RX[2] can perform data sampling according to a signal on the lane LA[0]. The multiplexer 722.1 may select the lane LA[3] as a clock lane, and the sampling circuits RX[4] and RX[5] can perform data sampling according to a signal on the lane LA[3]. The deserializer DS[0] may output a parallel clock signal associated with the signal on the lane LA[0], and the deserializers DS[1] and DS[2] may output parallel data signals associated with signals on the lanes LA[1] and LA[2], respectively. In addition, the deserializer DS[3] may output a parallel clock signal associated with the signal on the lane LA[3], and the deserializers DS[4] and DS[5] may output parallel data signals associated with signals on the lanes LA[4] and LA[5], respectively. In this mode, the multiplexers 722.0, 722.1 and 724.0 can represent an implementation of the clock tree group G2 shown in FIG. 5B.

Figure 8:
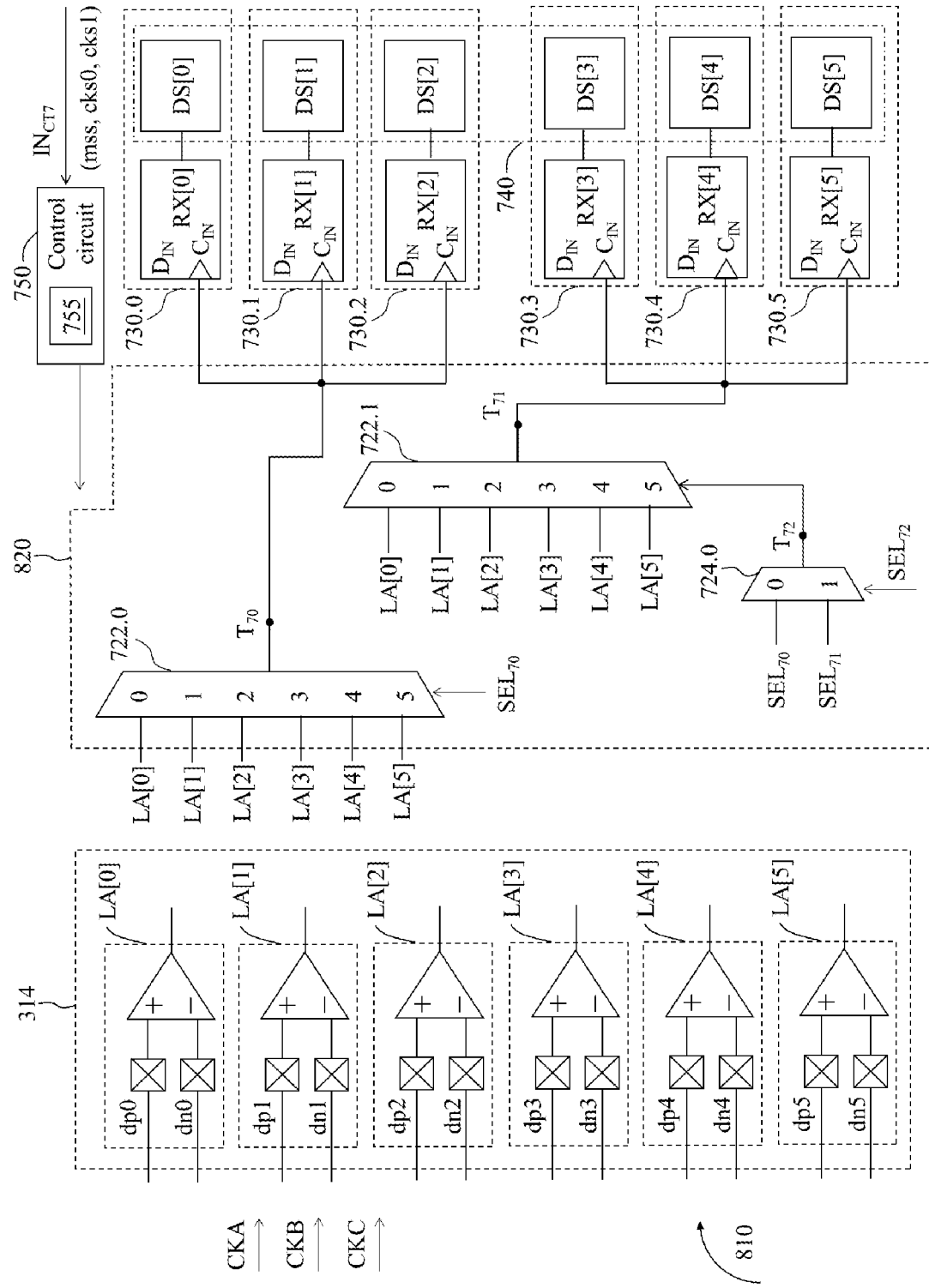
FIG. 8 illustrates another implementation of the integrated circuit shown in FIG. 1 in accordance with some embodiments of the present disclosure.

The circuit structures and operations described with reference to FIG. 7 are not intended to limit the scope of the present disclosure. For example, the lane selection circuit 720 can be implemented by the lane selection circuit 320 shown in FIG. 3 or the lane selection circuit 620 shown in FIG. 6 without departing from the scope of the present disclosure. As another example, the multiplexers 722.0, 722.1 and 724.0 in the lane selection circuit 720 can be arranged in a manner shown in FIG. 8. Referring to FIG. 8, the structure of the integrated circuit 810 is similar/identical to that of the integrated circuit 710 shown in FIG. 7 except for the lane selection circuit 820. In the present embodiment, the multiplexer 724.0 is configured to couple one of the clock select signals $SEL_{70}$ and $SEL_{71}$ to the output terminal $T_{72}$ according to the clock select signal $SEL_{72}$. The multiplexer 722.1 is configured to couple the lanes LA[0]-LA[5] to the output terminal $T_{71}$ according to a signal outputted from the multiplexer 724.0. As those skilled in the art can understand operation of the lane selection circuit 820 after reading paragraphs directed to FIGS. 1-7, further description associated with lane selection is omitted here for brevity.

Please note that, to facilitate lane selection, a clock select signal used in the clock forwarding scheme may have a signal value/pattern mapping to a lane identifier of a clock lane to be selected. A lane selection circuit can select this clock lane according to the clock select signal. In some embodiments, the lane identifier may be a lane name of the selected clock lane, a pin name of a signal pin included in the selected clock lane, or a pin number of the signal pin. Such lane identifier can be labeled on a circuit board where an integrated circuit having the selected clock lane is disposed, or on a package encapsulating the integrated circuit. As another example, such lane identifier can be labeled or described in a datasheet, a data book or device specifications for the integrated circuit. In some other embodiments, the lane identifier may be identification information carried on the selected clock lane. The integrated circuit can determine which lane should be selected as a clock lane by detecting the identification information.

Referring again to FIG. 7, the integrated circuit 710 further includes a control circuit 750, which is configured to generate the clock select signals $SEL_{70}$-$SEL_{72}$ to control the lane selection circuit 720. When the clock select signal $SEL_{70}$/$SEL_{71}$ has a signal value mapping to a lane identifier of one of the lanes LA[0]-LA[5], the lane selection circuit 720 is configured to select the one of the lanes LA[0]-LA[5] according to the clock select signal $SEL_{70}$/$SEL_{71}$. In the present embodiment, each of respective lane identifiers of the lanes LA[0]-LA[5] may include a numeral symbol, and respective numeral symbols of the lane identifiers are indicative of a group of consecutive numbers. By way of example but not limitation, a pin name corresponding to a lane can be used as a lane identifier of the lane. A pair of signal pins of the lane LA[0] are assigned pin names "dp0" and "dn0", a pair of signal pins of the lane LA[1] are assigned pin names "dpi" and "dn1", and so on. Respective numeral symbols of the pin names dp0-dp5, i.e. "0" to "5", are indicative of a group of consecutive numbers 0 to 5.

In the present embodiment, the control circuit 750 is configured to generate the clock select signals $SEL_{70}$-$SEL_{72}$ in response to a control input $IN_{CT7}$ which can indicate information on a lane identifier of a selected clock lane. The control input $IN_{CT7}$ may include, but is not limited to, a mode selection signal mss, a lane select signal cks0 and a lane select signal cks1. The mode select signal mss indicates a mode of the integrated circuit 710. For example, the mode select signal mss may include one bit to indicate if the integrated circuit 710 operates in a "1C" mode or a "2C" mode. The integrated circuit 710 operates in the "1C" mode to receive a single clock signal through the multi-lane interface 314. The integrated 710 operates in the "2C" mode to receive two clock signals through the multi-lane interface 314.

The lane select signal cks0, including but not limited to three bits, can indicate a lane identifier of a selected clock lane, i.e. one of the lanes LA[0]-LA[5]. The lane select signal cks0 may have a bit pattern, or a signal value, mapping to the lane identifier of the selected clock lane. For example, the lane select signal cks0 having a bit pattern 000, which corresponds to a signal value of 0, may indicate that the lane LA[0] is selected as a clock lane. As another example, the lane select signal cks0 having a bit pattern 011, which corresponds to a signal value of 3, may indicate that the lane LA[3] is selected as a clock lane.

The lane select signal cks1, including but not limited to three bits, can indicate a lane identifier of a selected clock lane, i.e. one of the lanes LA[0]-LA[5]. The lane select signal cks1 may have a bit pattern, or a signal value, mapping to the lane identifier of the selected clock lane. When the integrated circuit 710 operates in the "2C" mode to receive two clock signals through two selected clock lanes, the lane select signal cks0 can indicate a lane identifier of one of the selected clock lanes, and the lane select signal cks1 can indicate a lane identifier of the other of the selected clock lanes. For example, when the lane select signals cks0 and cks1 have bit patterns 000 and 011 in the "2C" mode respectively, the control input $IN_{CT7}$ indicates that each of the lanes LA[0] and LA[3] is selected as a clock lane to receive a corresponding clock signal.

In operation, when the integrated circuit 710 operates in a mode such as a "1C" mode to receive a single clock signal CKA through the multi-lane interface 314, the control circuit 750 may generate the clock select signal $SEL_{72}$ in response to the control input $IN_{CT7}$. The clock select signal $SEL_{72}$ may have a first signal value such that a signal on the output terminal $T_{70}$ can be distributed to each sampling circuit. For example, the control circuit 750 may generate the clock select signal $SEL_{72}$ according to the mode select signal mss. As another example, the control circuit 750 may use the mode select signal mss as the clock select signal $SEL_{72}$. It is worth noting that, in some embodiments, the mode select signal mss included in the control input $IN_{CT7}$ can be directly inputted to the multiplexer 724.0 to serve as the clock select signal $SEL_{72}$.

Also, the control circuit 750 may generate the clock select signal $SEL_{70}$ according to a lane identifier of a lane to which the clock signal CKA is inputted. In the present embodiment, the control circuit 750 may generate the clock select signal $SEL_{70}$ according to the lane select signal cks0 indicating a lane identifier of the lane to which the clock signal CKA is inputted. For example, when the lane select signal cks0 indicates that the lane LA[0] is configured as a clock lane to receive the clock signal CKA, the control circuit 750 may refer to the lane select signal cks0 to generate the clock select signal $SEL_{70}$ having a signal value of 0, which maps to a numeral symbol "0" of the pin name dp0/dn0, i.e. a lane identifier of the lane LA[0]. As another example, when the lane select signal cks0 indicates that the lane LA[3] is configured as a clock lane to receive the clock signal CKA, the control circuit 750 may refer to the lane select signal cks0 to generate the clock select signal $SEL_{70}$ having a signal value of 3, which maps to a numeral symbol "3" of the pin name dp3/dn3. It is worth noting that, in some embodiments, the control circuit 750 may use the lane select signal cks0 as the clock select signal $SEL_{70}$ since the lane select signal cks0 may have a signal value mapping to a lane identifier of a selected clock lane.

When the integrated circuit 710 operates in another mode such as the "2C" mode to receive two clock signals CKB and CKC through the multi-lane interface 314, the control circuit 750 may generate the clock select signal $SEL_{72}$ in response to the control input $IN_{CT7}$. The clock select signal $SEL_{72}$ may have a second signal value different from the first signal value. As a result, a signal on the output terminal $T_{70}$ can be distributed to the sampling circuits RX[0]-RX[2], while a signal on the output terminal $T_{71}$ can be distributed to the sampling circuits RX[3]-RX[5]. For example, the control circuit 750 may generate the clock select signal $SEL_{72}$ according to the mode select signal mss, or use the mode select signal mss as the clock select signal $SEL_{72}$. It is worth noting that, in some embodiments, the mode select signal mss included in the control input $IN_{CT7}$ can be directly inputted to the multiplexer 724.0 to serve as the clock select signal $SEL_{72}$.

In addition, the control circuit 750 may generate the clock select signal $SEL_{70}$ according to a lane identifier of a lane to which the clock signal CKB is inputted, and generate the clock select signal $SEL_{71}$ according to a lane identifier of a lane to which the clock signal CKC is inputted. In the present embodiment, the control circuit 750 may generate the clock select signals $SEL_{70}$ and $SEL_{71}$ according to the lane select signals cks0 and cks1, respectively, in the another mode such as the "2C" mode. For example, when the lane select signals cks0 and cks1 indicate that the lanes LA[0] and LA[3] are configured as clock lanes to receive the clock signals CKB and CKC, respectively, the control circuit 750 can refer to the lane select signal cks0 to generate the clock select signal $SEL_{70}$ having a signal value of 0, and refer to the lane select signal cks1 to generate the clock select signal $SEL_{71}$ having a signal value of 3. It is worth noting that, in some embodiments, the control circuit 750 may use the lane select signals cks0 and cks1 as the clock select signals $SEL_{70}$ and $SEL_{71}$, respectively, since each of the lane select signals cks0 and cks1 may have a signal value mapping to a lane identifier of a selected clock lane.

In some embodiments, a transmitter side may send a preamble signal to a lane on a receiver side before sending a clock signal to the lane. The receiver side can determine if the clock signal will arrive at the lane by detecting an occurrence of the preamble signal. When detecting a preamble signal occurring on a predetermined lane on the receiver side, the receiver side can operate in a bifurcation mode to support multi-clock transmission. For example, in the embodiment shown in FIG. 7, the control circuit 750 may include a state machine 755 to automatically select a mode of the integrated circuit 710.

Figure 9:
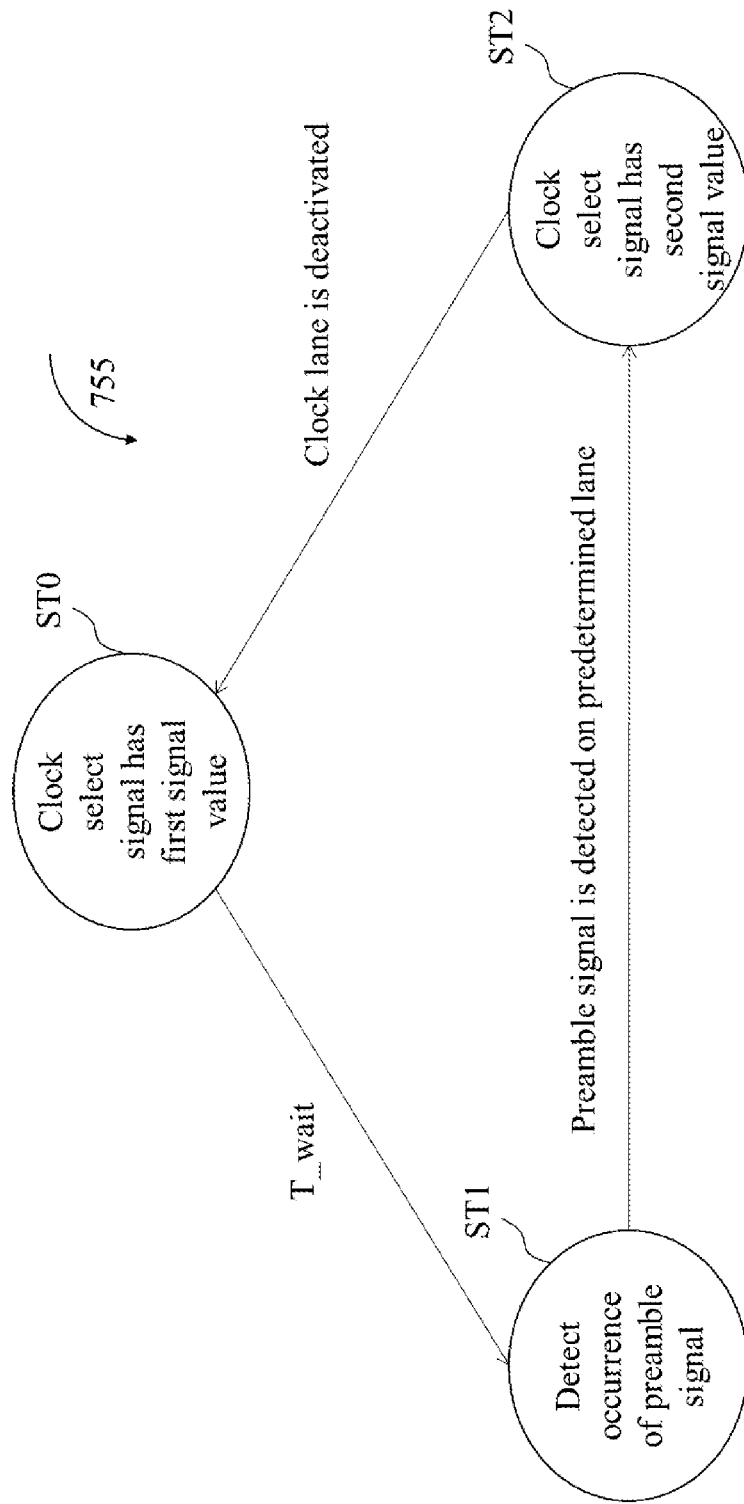
FIG. 9 illustrates operation of the state machine shown in FIG. 7 in accordance with some embodiments of the present disclosure.

FIG. 9 illustrates operation of the state machine 755 shown in FIG. 7 in accordance with some embodiments of the present disclosure. Referring to FIG. 9 and also to FIG. 7, the state machine 755 may stay in a state ST0, e.g. an initial state, when a physical layer having the integrated circuit 710 is enabled. In the state ST0, the clock select signal $SEL_{72}$ may have the first signal value such that a signal on a selected clock lane can be distributed to each sampling circuit through the output terminal $T_{70}$. After a period of time T_wait, the state machine 755 may enter a state ST1 such that the control circuit 750 is configured to detect if the multi-lane interface 314 receives a preamble signal. When the preamble signal is detected on a predetermined lane, i.e. another selected clock lane, in the multi-lane interface 314, the state machine 755 may enter a state ST2, and the clock select signal $SEL_{72}$ may have the second signal value such that the integrated circuit 710 may operate in a bifurcation mode. After the predetermined lane is deactivated, the state machine 755 may return to the state ST0. A signal value of the clock select signal $SEL_{72}$ may be set to the first signal value.

In some embodiments, the predetermined lane may be a lane indicated by the lane select signal cks1. The control circuit 750 can be configured to determine a signal value of the clock select signal $SEL_{72}$ by detecting if a preamble signal is inputted to the lane indicated by the lane select signal cks1. In some embodiments, the control circuit 750 can be configured to detect if any lane, in addition to a lane indicated by the lane select signal cks0, receives a preamble signal. Each lane detected by the control circuit 750 corresponds to the predetermined lane detected in the state ST1.

The automatic lane detection described above is provided for illustrative purposes, and is not intended to limit the scope of the present disclosure. Referring to FIG. 7 again, in some embodiments, the control circuit 750 shown in FIG. 7 can be configured to detect if more than one preamble signal arrives at the multi-lane interface 314. When detecting that more than one preamble signal arrives at the multi-lane interface 314, the control circuit 750 can operate in a bifurcation mode to support multi-clock transmission. For example, the control circuit 750 may be coupled to the multi-lane interface 314, and generate the clock select signal $SEL_{72}$ having the first signal value when detecting a single preamble signal carried on a lane. When detecting preamble signals carried on two lanes, the control circuit 750 may generate the clock select signal $SEL_{72}$ having the second signal value such that the integrated circuit 710 operates in a bifurcation mode.

In addition, the implementation of lane selection utilizing mapping between a lane identifier and a control input described above is provided for illustrative purposes, and is not intended to limit the scope of the present disclosure. In some embodiments, the control circuit 750 may include a decoder (not shown in FIG. 7). The decoder can be configured to decode a lane select signal to generate a clock select signal for a clock lane to be selected, wherein the lane select signal has a signal value/pattern mapping to a lane identifier of the clock lane. As a result, the control circuit 750 can correctly select the clock lane according to mapping between the lane identifier of the clock lane and the lane select signal included in the control input $IN_{CT7}$.

Please note that a signal value of a lane select signal, or a signal value of a clock select signal, may directly or indirectly map to a lane identifier of a lane to be selected. For example, when the clock signal CKA/CKB is inputted to the lane LA[0], the lane select signal cks0 may have a bit pattern 000001, which corresponds to a signal value of $2^0$ mapping to the numeral symbol "0" of the pin name dp0/dn0. Additionally, or alternatively, the control circuit 750 may generate the clock select signal $SEL_{70}$ having a bit pattern 000001, which corresponds to a signal value of $2^0$ mapping to the numeral symbol "0" of the pin name dp0/dn0. As another example, when the clock signal CKC are inputted to the lane LA[3], the lane select signal cks1 may have a bit pattern 001000, which corresponds to a signal value of 23 mapping to the numeral symbol "3" of the pin name dp3/dn3. Additionally, or alternatively, the control circuit 750 may generate the clock select signal $SEL_{71}$ having a bit pattern 001000, which corresponds to a signal value of $2^3$ mapping to the numeral symbol "3" of the pin name dp3/dn3.

Figure 10:
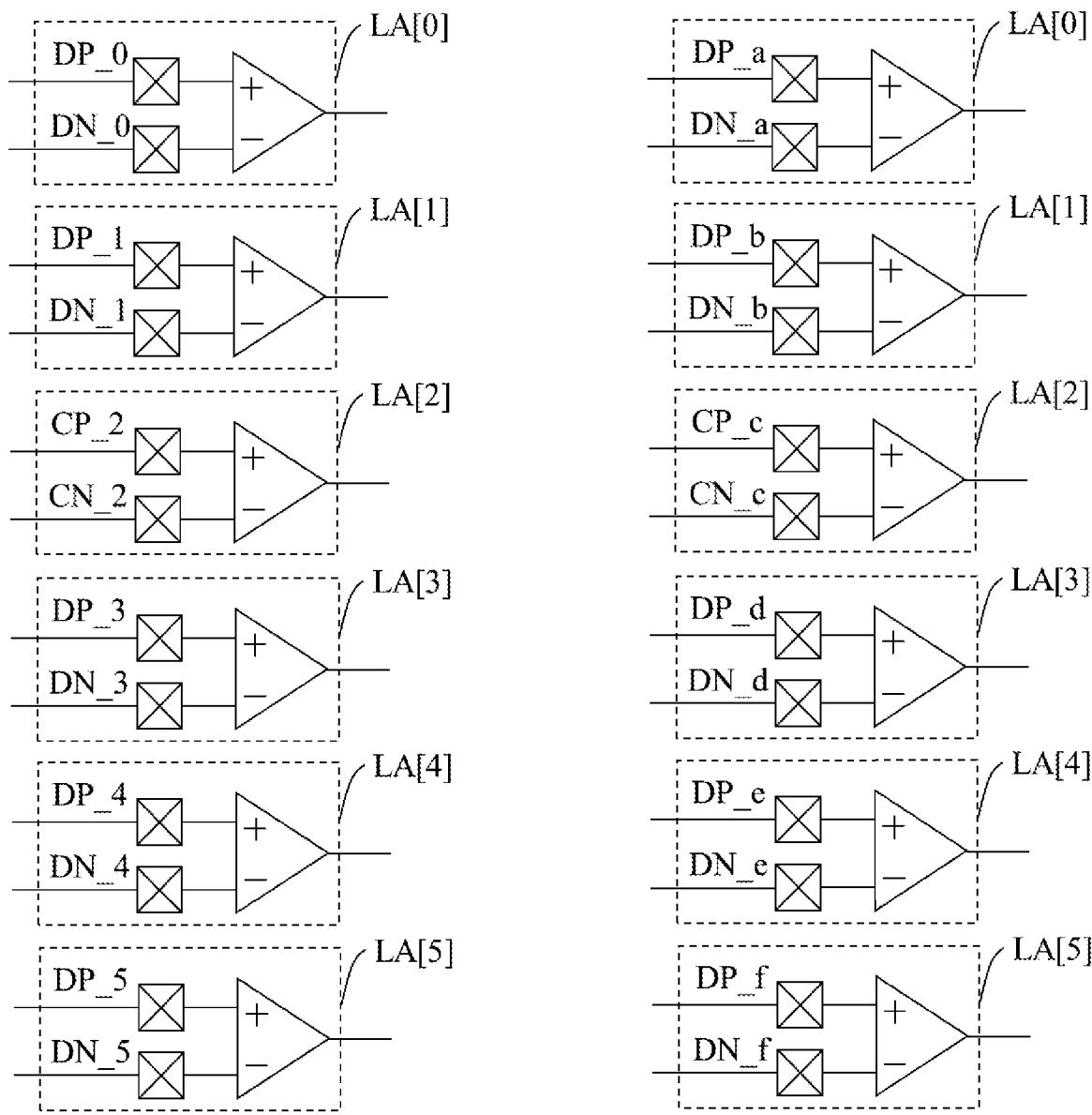
FIG. 10 illustrates some implementations of lane identifiers for the lanes shown in FIG. 7 in in accordance with some embodiments of the present disclosure.

In some embodiments, other types of lane identifiers, such as lane names, pin numbers or identification information carried on a lane, may map to a signal value of a lane select signal. In some embodiments, the control circuit 750 may refer to other types of lane identifiers, such as lane names, pin numbers or identification information carried on a lane, to determine a signal value of a clock select signal. In some embodiments, a numeral symbol of a lane identifier may be in the form of Arabic numerals, Roman numerals, letters, or other types of numeral symbols. In some embodiments, a group of consecutive numbers indicated by respective number symbols of lane identifiers may be odd consecutive numbers, even consecutive numbers, or a plurality of numbers in a predetermined consecutive order. For example, some implementations of lane identifiers for the lanes LA[0]-LA[5] shown in FIG. 7 are illustrated in FIG. 10 in accordance with some embodiments of the present disclosure. Such modifications and alternatives are also within the contemplated scope of the present disclosure.

The lane selection described above can be employed in the integrated circuit 110 shown in FIG. 1, the integrated circuit 310 shown in FIG. 3, the integrated circuits 510A-510C shown in FIG. 5A-5C, the integrated circuit 610 shown in FIG. 6 and the integrated circuit 810 shown in FIG. 8. For example, referring again to FIG. 3, the integrated circuit 310 further includes a control circuit 350, which is configured to generate the clock select signals $SEL_{00}$, $SEL_{01}$ and $SEL_{00}$-$SEL_{15}$ in response to a control input $IN_{CT3}$ to thereby control the lane selection circuit 320.

The control input $IN_{CT3}$ can indicate information on a lane identifier of a selected clock lane. For example, the control input $IN_{CT3}$ may include a plurality of lane select signals, each of which being capable of indicating a lane identifier of a selected clock lane. The control circuit 350 may refer to a lane select signal to generate the clock select signal $SEL_{00}$, and refer to another lane select signal to generate the clock select signal $SEL_{01}$. As another example, the control input $IN_{CT3}$ may further include a mode selection signal capable of indicating a mode of the integrated circuit 310. The control circuit 350 may generate the clock select signals $SEL_{00}$-$SEL_{15}$ according to the mode select signal.

In a "5D1C" lane configuration, the clock select signals $SEL_{00}$-$SEL_{15}$ may have a same signal value such that one of the output sides S02 and S12 can be coupled to each sampling circuit. When the clock signal 5D_CLK is inputted to one of the lanes LA[0]-LA[2], the clock select signals $SEL_{00}$-$SEL_{15}$ may have a first signal value such that the output side S02 can be coupled to each sampling circuit. The control circuit 350 may generate the clock select signal $SEL_{00}$ according to a lane select signal of the control input $IN_{CT3}$, which has a signal value mapping to a lane identifier of the one of the lanes LA[0]-LA[2]. Additionally, or alternatively, the clock select signal $SEL_{00}$ may have a signal value mapping to the lane identifier of the one of the lanes LA[0]-LA[2]. When the clock signal 5D_CLK is inputted to one of the lanes LA[3]-LA[5], the clock select signals $SEL_{00}$-$SEL_{15}$ may have a second signal value such that the output side S12 can be coupled to each sampling circuit. The control circuit 350 may generate the clock select signal $SEL_{01}$ according to another lane select signal of the control input $IN_{CT3}$, which has a signal value mapping to a lane identifier of the one of the lanes LA[3]-LA[5]. Additionally, or alternatively, the clock select signal $SEL_{01}$ may have having a signal value mapping to the lane identifier of the one of the lanes LA[3]-LA[5].

In "2D1C" lane configurations with bifurcation, each of the clock select signals $SEL_{00}$-$SEL_{12}$ may have a signal value different from that of each of the clock select signals $SEL_{13}$-$SEL_{15}$. As a result, the output side S02 can be coupled to the sampling circuits RX[0]-RX[2], while the output side S12 can be coupled to the sampling circuits RX[3]-RX[5]. As the clock signal 2D_CLK0 is inputted to one of the lanes LA[0]-LA[2], the control circuit 350 may generate the clock select signal $SEL_{00}$ according to a lane select signal of the control input $IN_{CT3}$, which has a signal value mapping to a lane identifier of the one of the lanes LA[0]-LA[2]. Additionally, or alternatively, the clock select signal $SEL_{00}$ may have having a signal value mapping to the lane identifier of the one of the lanes LA[0]-LA[2]. Similarly, as the clock signal 2D_CLK1 is inputted to one of the lanes LA[3]-LA[5], the control circuit 350 may generate the clock select signal $SEL_{01}$ according to another lane select signal of the control input $IN_{CT3}$, which has a signal value mapping to a lane identifier of the one of the lanes LA[3]-LA[5]. Additionally, or alternatively, the clock select signal $SEL_{01}$ may have a signal value mapping to the lane identifier of the one of the lanes LA[3]-LA[5].

In some embodiments, the clock select signal $SEL_{00}$ and the clock select signal $SEL_{01}$ can be implemented as a single clock select signal. Each of the lane selection units 322.0 and 322.1 can perform lane selection according to the single clock select signal.

The control circuit 350 can determine a signal value/pattern of the single clock select signal according to one or more lane identifiers of one or more lanes to be selected. For example, in a "5D1C" lane configuration, the single clock select signal has a signal value mapping to a lane identifier of a lane where the clock signal 5D_CLK is inputted. As another example, in "2D1C" lane configurations with bifurcation, the first three least significant bits (LSBs) of the single clock select signal may have a signal value mapping to a lane identifier of one of the lanes LA[0]-LA[2], and the first three most significant bits (MSBs) of the single clock select signal may have a signal value mapping to a lane identifier of one of the lanes LA[3]-LA[5].

Similarly, referring again to FIG. 1, the integrated circuit 110 further includes a control circuit 150, which is configured to generate a clock select signal according to a control input $IN_{CT1}$ or according to a lane identifier of one of the selected clock lanes. The control input $IN_{CT1}$ can indicate the lane identifier. Additionally, or alternatively, the clock select signal can have a signal value mapping to the lane identifier. As a result, the lane selection circuit 120 can select such lane according to the clock select signal.

Additionally, or alternatively, in the embodiments shown in FIG. 5A, FIG. 5B, FIG. 5C and FIG. 6, a signal value of the clock select signal $SEL_A/SEL_{B1}/SEL_{B2}/SEL_{C1}/SEL_{C2}/SEL_{C3}$ can be determined according to a lane identifier of a lane where a clock signal is inputted. After reading the above paragraphs directed to the lane selection operation described above with reference to FIG. 7, FIG. 8 and FIG. 3, those skilled in the art should appreciate details of generation of the clock select signal $SEL_A/SEL_{B1}/SEL_{B2}/SEL_{C1}/SEL_{C2}/SEL_{C3}$ shown FIG. 5A, FIG. 5B, FIG. 5C and FIG. 6. Further description is omitted here for brevity.

Figure 11:
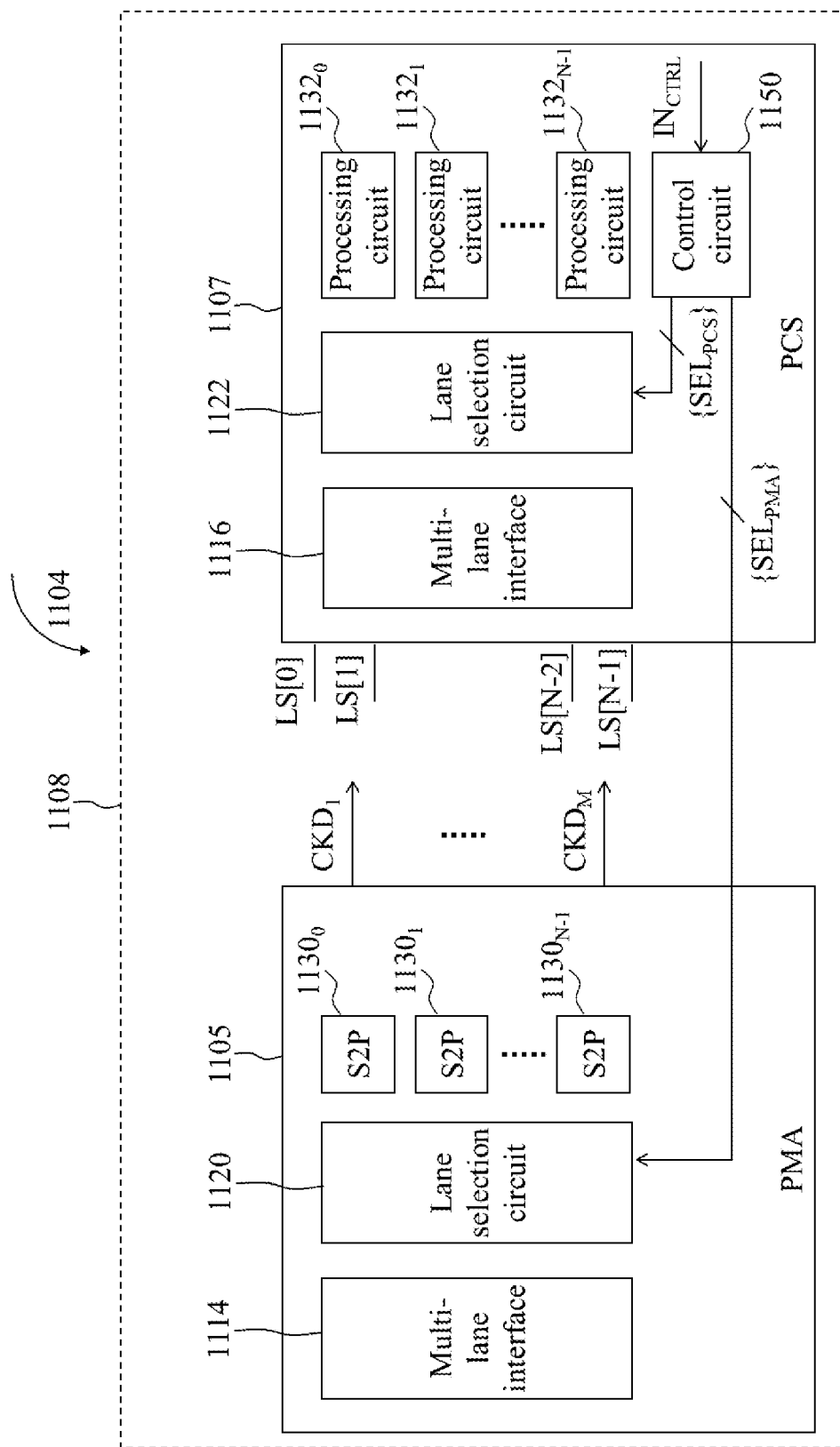
FIG. 11 is a block diagram illustrating an exemplary receiver in accordance with some embodiments of the present disclosure.

At least one of the aforementioned lane interchange scheme and lane selection operation can be employed in other sublayers of a physical layer such as a physical coding sublayer (PCS). FIG. 11 is a block diagram illustrating an exemplary receiver in accordance with some embodiments of the present disclosure. The receiver 1104 can represent an embodiment of the receiver 104 shown in FIG. 1. A physical layer 1108 of the receiver 1104 includes a PMA 1105 and a PCS 1107. The PMA 1105 can employ the circuit structures and operations described with reference to FIGS. 1-10.

The PMA 1105 includes, but is not limited to, a multi-lane interface 1114, a lane selection circuit 1120 and a plurality of serial-to-parallel (S2P) converters $1030_0$-$1030_{N-1}$, where N is an integer greater than one. The multi-lane interface 1114 and the lane selection circuit 1120 can represent embodiments of the multi-lane interface 1114 and the lane selection circuit 120 shown in FIG. 1, respectively. The multi-lane interface 1114 may include the N lanes LA[0]-LA[N−1] shown in FIG. 1. The lane selection circuit 1120 is configured to select one or more lanes of the multi-lane interface 1114 as one or more clock lanes according to a set of clock select signals $\{SEL_{PMA}\}$. In addition, the S2P converters $1030_0$-$1030_{N-1}$ can be implemented using the N sampling circuits RX[0]-RX[N−1] and the output circuit 140 shown in FIG. 1.

The PCS 1107 includes, but is not limited to, a multi-lane interface 1116, a lane selection circuit 1122 and a plurality of processing circuits $1132_0$-$1132_{N-1}$. The multi-lane interface 1116 can represent an embodiment of the multi-lane interface 114 shown in FIG. 1. The multi-lane interface 1116 includes N lanes LS[0]-LS[N−1] coupled to the PMA 1105. The lane selection circuit 1122 can represent an embodiment of the lane selection circuit 120 shown in FIG. 1. The lane selection circuit 1122 is configured to select one or more of the lanes LS[0]-LS[N−1] as one or more clock lanes according to a set of clock select signals $\{SEL_{PCS}\}$. Each of the lanes LS[0]-LS[N−1] can be interchanged between a clock lane and a data lane. In addition, the processing circuits $1132_0$-$1132_{N-1}$ can be implemented to include the N sampling circuits RX[0]-RX[N−1] shown in FIG. 1, respectively, to perform data sampling according one or more clock signals coming from the PMA 1105.

In operation, the PMA 1105 can be configured to output M clock signals $CKD_1$-$CKD_M$ associated with M different clock domains, respectively, wherein M is a positive integer less than N. The PCS 1107 can be configured to select M of the lanes LS[0]-LS[N−1] as M clock lanes to receive the clock signals $CKD_1$-$CKD_M$. In other words, the PCS 1107 can perform lane selection operation in response to lane selection operation of the PMA 1105. For example, the multi-lane interface 1114 of the PMA 1105 may receive M clock signals sent from M transmitters (not shown in FIG. 11) to generate the clock signals $CKD_1$-$CKD_M$, wherein the M transmitters operate in the M different clock domains, respectively. The lane selection circuit 1120 can select M lanes of the multi-lane interface 1114 as M clock lanes according to the set of clock select signals $\{SEL_{PMA}\}$. M of the S2P converters $1030_0$-$1030_{N-1}$, coupled to the M selected lanes, can generate the clock signals $CKD_1$-$CKD_M$, respectively. In response to lane selection operation of the PMA 1105, the lane selection circuit 1122 of the PCS 1107 can select M of the lanes LS[0]-LS[N−1] as M clock lanes according to the set of clock select signals $\{SEL_{PCS}\}$. One or more of remaining (N−M) of the lanes LS[0]-LS[N−1] serve as one or more data lanes. The processing circuits $1132_0$-$1132_{N-1}$ can process data on the one or more data lanes according to the clock signals $CKD_1$-$CKD_M$.

The set of clock select signals $\{SEL_{PMA}\}$ and the set of clock select signals $\{SEL_{PCS}\}$ can be generated from a control input shared by the PMA 1105 and the PCS 1107. In the present embodiment, the PCS 1107 may further include a control circuit 1150, which can represent an embodiment of the control circuit 150 shown in FIG. 1. The control circuit 1150 can be configured to generate the set of clock select signals $\{SEL_{PMA}\}$ and the set of clock select signals $\{SEL_{PCS}\}$ according to a control input $IN_{CTRL}$. The control input $IN_{CTRL}$ can indicate information on a lane identifier of a selected clock lane in the PMA 1105 and a lane identifier of a selected clock lane in the PCS 1107. For example, when the control input $IN_{CTRL}$ has a signal pattern/value mapping to a lane identifier of the lane LA[0] in the PMA 1105, the control circuit 1150 may refer to the control input $IN_{CTRL}$ to generate the set of clock select signals $\{SEL_{PMA}\}$, such that the lane LA[0] is configured as a clock lane to receive a clock signal sent from a transmitter (not shown in FIG. 11). In addition, the control circuit 1150 may refer to the control input $IN_{CTRL}$ to generate the set of clock select signals $\{SEL_{PCS}\}$ such that the lane LS[0], having a lane identifier mapping to a signal pattern/value of the control input $IN_{CTRL}$, can be configured as a clock lane to receive a clock signal from the PMA 1105 which is generated in response to the clock signal sent from the transmitter.

By way of example but not limitation, the control input $IN_{CTRL}$ may include a plurality of lane select signals, each of which being capable of indicating a lane identifier of a selected clock lane. As another example, the control input $IN_{CTRL}$ may include a mode selection signal and a plurality of lane select signals, wherein the mode selection signal can indicate a mode of the receiver 1104, such as a "1C" mode or a bifurcation mode. After reading the above paragraphs directed to FIGS. 1-10, those skilled in the art should appreciate that the control circuit 1150 can utilize mapping between a lane identifier and a control input to control the lane selection circuit 1120 and the lane selection circuit 1122. Repeated description associated with lane mapping is omitted here for brevity.

In some embodiments, the shared control circuit 1150 can be disposed in the PMA 1105 rather than the PCS 1107. In some embodiments, the PMA 1105 can have a first control circuit disposed therein, and the PCS 1107 can have a second control circuit disposed therein, wherein the first control circuit and the second control circuit can refer to a same control input, e.g. the control input $IN_{CTRL}$, to control lane selection operation. Such modifications and alternatives are also within the contemplated scope of the present disclosure.

Some embodiments are given in the following for further description of the PCS 1107 utilizing a lane interchange scheme. Those skilled in the art should appreciate that other physical coding sublayers utilizing the lane interchange scheme described above with reference to FIGS. 1-10 are also within the contemplated scope of the present disclosure.

Figure 12:
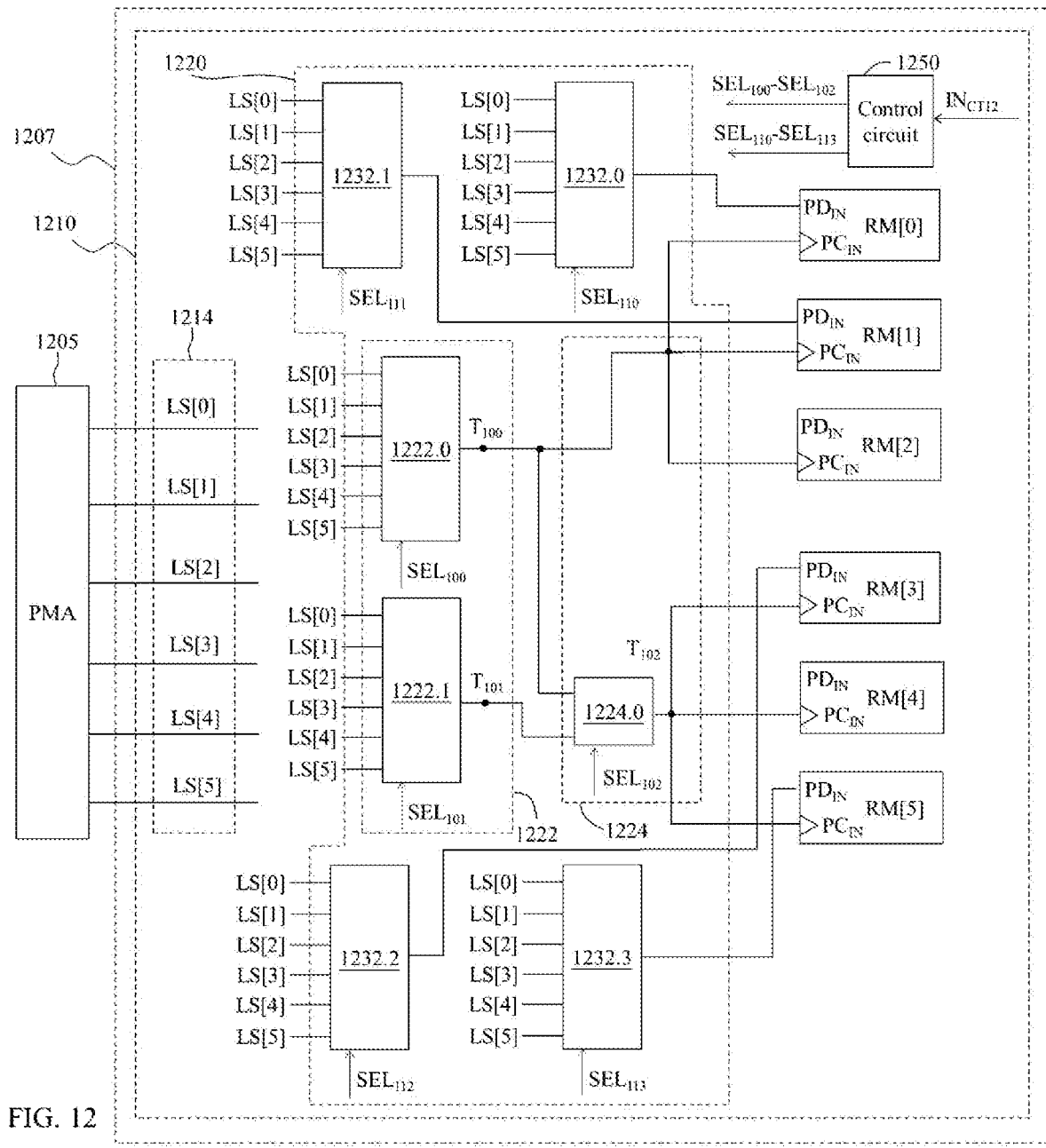
FIG. 12 illustrates an implementation of an integrated circuit in the physical coding sublayer shown in FIG. 11 in accordance with some embodiments of the present disclosure.

FIG. 12 illustrates an implementation of an integrated circuit in the PCS 1107 shown in FIG. 11 in accordance with some embodiments of the present disclosure. The integrated circuit 1210 in the PCS 1207 can represent an embodiment of the integrated circuit 110 shown in FIG. 1 which includes six lanes interchangeable between clock and data lanes, i.e. N=6. In the present embodiment, the PCS 1207 is configured to receive clock and data information sent from the PMA 1205, which can be an embodiment of the PMA 1105 shown in FIG. 11. The integrated circuit 1210 can include a multi-lane interface 1214, a lane selection circuit 1220 and a plurality of sampling circuits RM[0]-RM[5]. The multi-lane interface 1214 and the lane selection circuit 1220 can represent embodiments of the multi-lane interface 114 and the lane selection circuit 120 shown in FIG. 1, respectively. The sampling circuits RM[0]-RM[5] can represent embodiments of the sampling circuits RX[0]-RX[5] shown in FIG. 1.

The multi-lane interface 1214, coupled to the PMA 1205 includes a plurality of lanes LS[0]-LS[5] shown in FIG. 11. The lanes LS[0]-LS[5] can represent embodiments of the lanes LA[0]-LA[N−1] shown in FIG. 1, i.e. N=6. In the present embodiment, each of the lanes LS[0]-LS[5] can be configured to carry a multi-bit output signal, such as a byte data signal or a byte clock signal.

The lane selection circuit 1220 is configured to select one or more of the lanes LS[0]-LS[5] as one or more clock lanes. One or more of the remaining lanes serve as one or more data lanes. The lane selection circuit 1220 includes, but is not limited to, a plurality of selection stages 1222 and 1224, which can represent embodiments of the selection stages 122 and 124 shown in FIG. 1, respectively. In the present embodiment, the selection stage 1222 can be configured to couple one or two lanes to the selection stage 1224 in response to a mode of the integrated circuit 1210. The selection stage 1222 includes a plurality of lane selection units 1222.0 and 1222.1. The lane selection unit 1222.0 is configured to couple the lanes LS[0]-LS[5] to an output terminal $T_{100}$ according to a clock select signal $SEL_{100}$. The lane selection unit 1222.1 is configured to couple the lanes LS[0]-LS[5] to an output terminal $T_{101}$ according to a clock select signal $SEL_{101}$.

The selection stage 1224 can be implemented to include a lane selection unit 1224.0, which is configured to couple one of the output terminals $T_{100}$ and $T_{101}$ to an output terminal $T_{102}$ according to a clock select signal $SEL_{102}$.

The sampling circuits RM[0]-RM[5], coupled to the multi-lane interface 1214 and the lane selection circuit 1220, are configured to perform data sampling according to clock and data information transmitted from the PMA 1205. In the present embodiment, each of the sampling circuits RM[0]-RM[5] may include a clock input $PC_{IN}$ and a data input $PD_{IN}$. Each sampling circuit is configured to sample a signal inputted to a corresponding data input $PD_{IN}$ using a signal inputted to a corresponding clock input $PC_{IN}$.

In a mode where the integrated circuit 1210 is configured to support a "4D1C" lane configuration, the lane selection unit 1224.0 is configured to the output terminal $T_{100}$ to the output terminal $T_{102}$. When the lane selection unit 1222.0 selects one of the lanes LS[0]-LS[5] as a clock lane, a signal on the clock lane can be coupled to the output terminal $T_{100}$, and distributed to the respective clock inputs $PC_{IN}$ of the sampling circuits RM[0]-RM[5]. For example, when a clock signal is inputted to the lane LS[0], the lane selection unit 1222.0 may select the lane LS[0] as a clock lane, and four of the sampling circuits RM[0]-RM[5] can perform data sampling according to the same clock signal, i.e. a signal on the lane LS[0].

In another mode where the integrated circuit 1210 is configured to support "2D1C" lane configurations with bifurcation, the lane selection unit 1224.0 is configured to couple the output terminal $T_{101}$ to the output terminal $T_{102}$. When the lane selection unit 1222.0 selects one of the lanes LS[0]-LS[5] as a clock lane, the lane selection unit 1222.1 can select another of the lanes LS[0]-LS[5] as a clock lane. As a result, signals on the remaining lanes can be sampled according to signals on the selected clock lanes. For example, when two clock signal are inputted to the lanes LS[1] and LS[4] respectively, the lane selection unit 1222.0 may select the lane LS[1] as a clock lane, and the lane selection unit 1222.1 may select the lane LS[4] as another clock lane. Four of the sampling circuits RM[0]-RM[5] can perform data sampling according to these two clock signals associated with different clock domains.

Please note that the PCS 1207 may utilize the lane selection operation described above. In the present embodiment, the integrated circuit 1210 further includes a control circuit 1250, which is configured to generate the clock select signals $SEL_{100}$-$SEL_{02}$ according to a control input $IN_{CT12}$ to thereby control the lane selection circuit 1220. For example, when a clock signal transmitted from the PMA 1205 is inputted to one of the lanes LS[0]-LS[5] in a "4D1C" lane configuration, the control circuit 1250 may generate the clock select signal $SEL_{100}$ according to the control input $IN_{CT12}$ which indicates a lane identifier of the one of the lanes LS[0]-LS[5]. As another example, when two clock signals are inputted to two of the lanes LS[0]-LS[5] in "2D1C" lane configurations with bifurcation, the control circuit 1250 may generate the clock select signal $SEL_{100}$ according to the control input $IN_{CT12}$ which indicates a lane identifier of one of the two lanes. Also, the control circuit 1250 may generate the clock select signal $SEL_{101}$ according to the control input $IN_{CT12}$ which indicates a lane identifier of the other of the two lanes.

The lane selection operation described above can be applied to data lane selection. For example, the lane selection circuit 1220 further includes a plurality of lane selection units 1232.0-1232.3, which are controlled by a plurality of data select signals $SEL_{110}$-$SEL_{113}$ generated from the control circuit 1250. In the present embodiment, the lane selection units 1232.0-1232.3 are configured to provide data transmitted from PMA 1205 for the sampling circuits RM[0], RM[2], RM[3] and RM[5], respectively.

In a "4D1C" lane configuration where one of the lanes LS[0]-LS[5] is selected as a clock lane, the control circuit 1250 may generate the data select signals $SEL_{110}$-$SEL_{113}$ according to the control input $IN_{CT12}$ which indicates respective lane identifiers of four lanes carrying data signals sent by the PMA 1205. For example, respective signal values of the data select signals $SEL_{110}$-$SEL_{113}$ map to the lane identifiers of the four lanes, respectively.

In "2D1C" lane configurations where two of the lanes LS[0]-LS[5] are selected as clock lanes, the control circuit 1250 may generate the data select signals $SEL_{110}$ and $SEL_{111}$ according to the control input $IN_{CT12}$ which indicates respective lane identifiers of two lanes, which carry data signals associated with a clock signal outputted from the lane selection unit 1222.0. For example, respective signal values of the data select signals $SEL_{110}$ and $SEL_{11}$ map to the lane identifiers of these two lanes, respectively. Also, the control circuit 1250 may generate the data select signals $SEL_{112}$ and $SEL_{113}$ according to respective lane identifiers of the other two lanes, which carry on data signals associated with a clock signal outputted from the lane selection unit 1222.1. For example, respective signal values of the data select signals $SEL_{112}$ and $SEL_{113}$ map to the lane identifiers of the other two lanes, respectively.

As those skilled in the art should appreciate that the data lane selection employed in a clock forwarding scheme may be similar/identical to the clock lane selection described above with reference to FIGS. 1-11, repeated description is omitted here for brevity.

In some embodiments, the control circuit 1250 can be shared by the PMA 1205 and the PCS 1207. For example, the control circuit 1250 can generate one or more clock select signals to control a lane selection operation of the PMA 1205. As another example, the control circuit 1250 may use one or more clock select signals of the lane selection circuit 1220 to control a lane selection circuit of the PMA 1205 (not shown in FIG. 12), thereby making respective lane selection operations of the PMA 1205 and the PCS 1207 consistent with each other.

It is worth noting that the circuit structure and operations of the lane selection circuit 1220 shown in FIG. 12 are provided for illustrative purposes. In some embodiments, the lane selection circuit 1220 can be implemented using at least one of the lane selection circuit 120 shown in FIG. 1, the lane selection circuit 320 shown in FIG. 3, the lane selection circuits 520A-520C shown in FIGS. 5A-5C, the lane selection circuit 620 shown in FIG. 6, the lane selection circuit 720 shown in FIG. 7, the lane selection circuit 820 shown in FIG. 8, and associated modifications described above without departing from the scope of the present disclosure.

Figure 13:
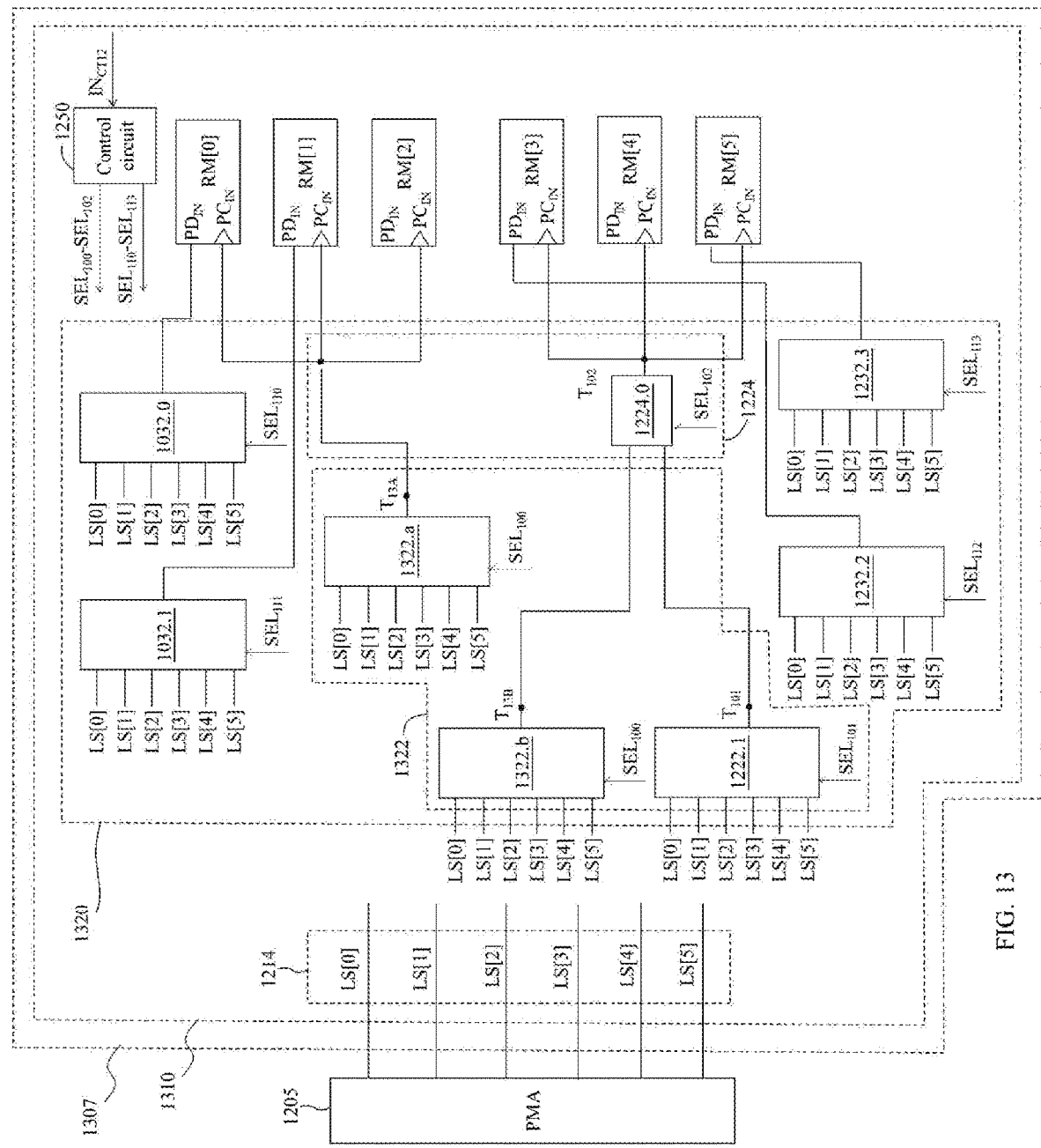
FIG. 13 illustrates another implementation of an integrated circuit in the physical coding sublayer shown in FIG. 11 in accordance with some embodiments of the present disclosure.

For example, referring to FIG. 13, another implementation of an integrated circuit in the PCS 1107 shown in FIG. 11 is illustrated in accordance with some embodiments of the present disclosure. The structure of the integrated circuit 1310 in the PCS 1307 is similar/identical to that of the integrated circuit 1210 shown in FIG. 2 except for the lane selection circuit 1320. In the present embodiment, the selection stage 1322 in the lane selection circuit 1320 includes the lane selection unit 1222.1 shown in FIG. 12, a lane selection unit 1322.*a* and a lane selection unit 1322.*b*. The lane selection unit 1322.*a* is configured to couple the lanes LS[0]-LS[5] to an output terminal $T_{13A}$ according to the clock select signal $SEL_{100}$, wherein the output terminal $T_{13A}$ is coupled to the respective clock inputs $PC_{IN}$ of the sampling circuits RM[0]-RM[2]. The lane selection unit 1322.*b* is configured to couple the lanes LS[0]-LS[5] to an output terminal $T_{13B}$ according to the clock select signal $SEL_{100}$, wherein the output terminal $T_{13B}$ is coupled to the lane selection unit 1224.0. As those skilled in the art can understand operation of the lane selection circuit 1320 after reading paragraphs directed to FIGS. 1-12, further description associated is omitted here for brevity.

Figure 14:
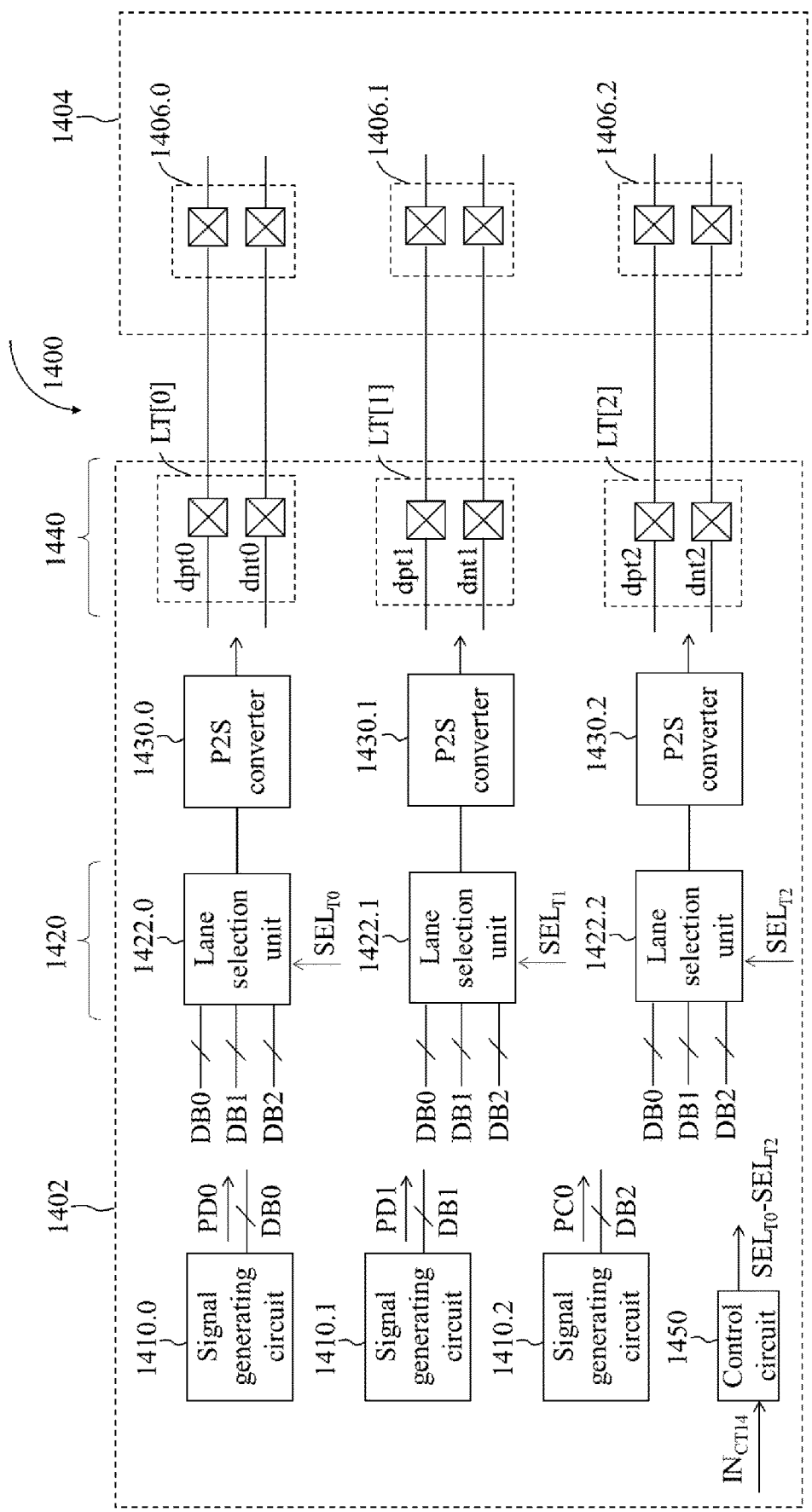
FIG. 14 is a block diagram illustrating an exemplary multi-lane communication system in accordance with some embodiments of the present disclosure.

Additionally, the lane selection scheme described above can be utilized by a transmitter side. FIG. 14 is a block diagram illustrating an exemplary multi-lane communication system in accordance with some embodiments of the present disclosure. The multi-lane communication system 1400 may include a transmitter 1402 and a receiver 1404. The transmitter 1402 can represent an embodiment of one of the transmitters TX[0]-TX[K−1] shown in FIG. 1. The receiver 1404 can employ circuit structures and operations described above with reference to FIGS. 1-13. In the present embodiment, the transmitter 1402 can have signals on a clock lane and a data lane thereof interchanged. The transmitter 1402 includes, but is not limited to, a plurality of signal generating circuits 1410.0-1410.2, a lane selection circuit 1420, a plurality of parallel-to-serial (P2S) converters 1430.0-1430.2, a multi-lane interface 1440 and a control circuit 1450.

Each of the signal generating circuits 1410.0-1410.2 is configured to generate a multi-bit output signal, such as a parallel clock signal or a parallel data signal, on a data bus. In the present embodiment, each of the signal generating circuits 1410.0 and 1410.1 can be implemented by a data signal generator, while the signal generating circuit 1410.2 can be implemented by a clock signal generator. As a result, the signal generating circuits 1410.0 and 1410.1 are configured to generate a plurality of parallel data signals PD0 and PD1 on the data buses DB0 and DB1, respectively. The signal generating circuit 1410.2 is configured to generate a parallel clock signal PC0 on the data bus DB2.

The lane selection circuit 1420, coupled to the signal generating circuits 1410.0-1410.2, is configured to distribute the multi-bit output signals of the signal generating circuits 1410.0-1410.2 to the P2S converters 1430.0-1430.2. In the present embodiment, the lane selection circuit 1420 includes a plurality of lane selection units 1422.0-1422.2. Each of the lane selection units 1422.0-1422.2 is configured to output one of output signals on the data buses DB0-DB2 according to a corresponding selection signal, i.e. one of selection signals $SEL_{T0}$-$SEL_{T2}$.

Each of the P2S converters 1430.0-1430.2 is configured to convert a parallel output signal to a serial output signal. The multi-lane interface 1440 can represent an embodiment of one of the multi-lane interfaces TF[0]-TF[K−1] shown in FIG. 1. The multi-lane interface 1440 includes a plurality of lanes LT[0]-LT[2], at least one of which is interchangeable between a clock lane and a data lane. In the present embodiment, each of the lanes LT[0]-LT[2] can be implemented using a two-wire lane, which is a differential lane including a pair of signal pins. A pair of signal pins of the lane LT[0] are assigned pin names "dpt0" and "dnt0", a pair of signal pins of the lane LT[1] are assigned pin names "dpt1" and "dnt1", and so on. In some embodiments, each of the lanes LT[0]-LT[2] can be implemented using other types of lanes, such as a single-wire lane or a lane having more than two wires, without departing from the scope of the present disclosure.

The control circuit 1450 is configured to generate the selection signals $SEL_{T0}$-$SEL_{T2}$ according to a control input IN$_{CT14}$ to thereby control the lane selection circuit 1420. A signal value of each of the selection signals SEL$_{T0}$-SEL$_{T2}$ can be determined according to the control input IN$_{CT14}$ which indicates a lane identifier of a corresponding lane. For example, the receiver 1404 may use the lane 1406.0 as a clock lane for receiving clock information sent by the transmitter 1402. The lanes 1406.1 and 1406.2 can serve as data lanes of the receiver 1404. By coupling the signal generating circuit 1410.2 to the P2S converter 1430.0, the lane selection unit 1422.0 can select the lane LT[0], which is coupled to the lane 1406.0, as a clock lane according to the selection signal SEL$_{T0}$. The control circuit 1450 can determine a signal value of the selection signal SEL$_{T0}$ according to a lane identifier of the lane LT[0], such as the pin name dpt0/dnt0 or the lane name "LT[0]". Also, the lane selection unit 1422.1 can select the lane LT[1] as a data lane according to the selection signal SEL$_{T1}$, and the lane selection unit 1422.2 can select the lane LT[2] as a data lane according to the selection signal SEL$_{T2}$. As those skilled in the art should appreciate details of clock/data lane selection of the lane selection circuit 1420 after reading the above paragraphs directed to the clock/data lane selection on a receiver side described above, further description is omitted here for brevity.

The above circuit structures are provided for illustrative purposes, and are not intended to limit the scope of the present disclosure. In some embodiments, the number of lanes in a multi-lane interface described above can vary according to different requirements and applications. For example, the multi-lane interface could include four lanes, eight lanes or any other number of lanes according to various embodiments. In some embodiments, one or more lane selection units described above can be implemented using one or more multiplexers, or any other types of circuitry having signal path selection capability. In some embodiments, one or more multiplexers described above can be implemented based on inverters, OR-logic gates, any other types of circuitry having signal path selection capability, or a combination thereof.

With the use of at least one lane interchangeable between a data lane and a clock lane, a physical layer on a receiver side can support different lane configurations on a transmitter side. For example, the physical layer can be split into multiple physical interfaces to support multiple transmitters. Also, a clock/data lane can be selected according to a lane identifier thereof, thereby facilitating selection of clock/data lanes.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit in a transmitter, the integrated circuit comprising:
   a multi-lane interface having N lanes, N being an integer greater than one;
   N signal generating circuits, coupled to the multi-lane interface, wherein M of the N signal generating circuits are configured to generate M clock signals respectively, and (N-M) of the N signal generating circuits are configured to generate (N-M) data signals respectively, M being a positive integer less than N;
   a lane selection circuit, coupled between the multi-lane interface and the N signal generating circuits, the lane selection circuit being configured to select M of the N lanes as M clock lanes by coupling the M clock signals to the M clock lanes respectively, and couple one of the (N-M) data signals to one of remaining (N-M) lanes according to a data select signal, wherein the remaining (N-M) lanes serve as (N-M) data lanes; and
   a control circuit, configured to generate the data select signal according to a lane identifier of the one of the (N-M) lanes, wherein the data select signal has a signal value mapping to the lane identifier of the one of the (N-M) lanes;
wherein each of the M clock signals and the (N-M) data signals is a multi-bit output signal; the integrated circuit further comprises:
   N parallel-to-serial converters, coupled between the lane selection circuit and the multi-lane interface, the N parallel-to-serial converters being configured to convert the M clock signals and the (N-M) data signals to N serial output signals, respectively, and output the N serial output signals to the N lanes respectively.

2. The integrated circuit of claim 1, wherein the control circuit is configured to generate a clock select signal according to a lane identifier of one of the selected M lanes, and the clock select signal has a signal value mapping to the lane identifier of the one of the selected M lanes; the lane selection circuit is further configured to couple one of the M clock signals to the one of the selected M lanes according to the clock select signal.

3. The integrated circuit of claim 1, wherein the lane selection circuit comprises:
   N lane selection units, wherein each lane selection unit is coupled to the N signal generating circuits through N data buses, and is configured to output one of N output signals on the N data buses according to a selection signal;
wherein when the selection signal is the data select signal, the outputted one of the N output signals is the one of the (N-M) data signals.

4. The integrated circuit of claim 3, wherein when the selection signal is a clock select signal generated by the control circuit, the outputted one of the N output signals is one of the M clock signals outputted to one of the selected M lanes; the clock select signal has a signal value mapping to a lane identifier of the one of the selected M lanes.

5. The integrated circuit of claim 1, wherein each of respective lane identifiers of the N lanes comprises a numeral symbol, and respective numeral symbols of the lane identifiers are indicative of a group of consecutive numbers.

6. The integrated circuit of claim 1, wherein the lane identifier of the one of the (N-M) lanes is a lane name of the one of the (N-M) lanes.

7. The integrated circuit of claim 1, wherein the lane identifier of the one of the (N-M) lanes is a pin name of a signal pin included in the one of the (N-M) lanes.

8. The integrated circuit of claim 1, wherein the lane identifier of the one of the (N-M) lanes is a pin number of a signal pin included in the one of the (N-M) lanes.

9. An integrated circuit of a transmitter, the integrated circuit comprising:
   a multi-lane interface having N lanes, N being an integer greater than one;

N signal generating circuits, coupled to the multi-lane interface, wherein M of the N signal generating circuits are configured to generate M clock signals respectively, and (N-M) of the N signal generating circuits are configured to generate (N-M) data signals respectively, M being a positive integer less than N;

a lane selection circuit, coupled between the multi-lane interface and the N signal generating circuits, the lane selection circuit being configured to select M of the N lanes as M clock lanes, remaining (N-M) lanes serving as (N-M) data lanes, wherein in a mode, one of the N lanes is selected as a clock lane for outputting one of the M clock signals according to a clock select signal; in another mode, the selected one of the N lanes serves as a data lane for outputting one of the (N-M) data signals according to a data select signal; and a control circuit, configured to generate the clock select signal and the data select signal, wherein the control circuit is configured to generate the data select signal according to a lane identifier of the selected one of the N lanes in the another mode, and the data select signal has a signal value mapping to the lane identifier of the selected one of the N lanes;

wherein each of the M clock signals and the (N-M) data signals is a multi-bit output signal; the integrated circuit further comprises:

N parallel-to-serial converters, coupled between the lane selection circuit and the multi-lane interface, the N parallel-to-serial converters being configured to convert the M clock signals and the (N-M) data signals to N serial output signals, respectively, and output the N serial output signals to the N lanes respectively.

10. The integrated circuit of claim 9, wherein the control circuit is configured to generate the clock select signal according to a lane identifier of the selected one of the N lanes in the mode, and the clock select signal has a signal value mapping to the lane identifier of the selected one of the N lanes.

11. The integrated circuit of claim 9, wherein the lane selection circuit comprises:

N lane selection units, wherein each lane selection unit is coupled to the N signal generating circuits through N data buses, and is configured to output one of N output signals on the N data buses according to a selection signal;

wherein when the selection signal is the data select signal, the outputted one of the N output signals is the one of the (N-M) data signals.

12. The integrated circuit of claim 11, wherein when the selection signal is the clock select signal, the outputted one of the N output signals is one of the M clock signals outputted to one of the selected M lanes; the clock select signal has a signal value mapping to a lane identifier of the one of the selected M lanes.

13. The integrated circuit of claim 9, wherein each of respective lane identifiers of the N lanes comprises a numeral symbol, and respective numeral symbols of the lane identifiers are indicative of a group of consecutive numbers.

14. The integrated circuit of claim 9, wherein the lane identifier of the selected one of the N lanes is a lane name of the one of the (N-M) lanes.

15. The integrated circuit of claim 9, wherein the lane identifier of the selected one of the N lanes is a pin name of a signal pin included in the one of the (N-M) lanes.

16. The integrated circuit of claim 9, wherein the lane identifier of the selected one of the N lanes is a pin number of a signal pin included in the one of the (N-M) lanes.

* * * * *